(12) United States Patent
Elliott

(10) Patent No.: US 10,387,815 B2
(45) Date of Patent: Aug. 20, 2019

(54) CONTINUOUSLY VARIABLE RESOLUTION OF RESOURCE ALLOCATION

(71) Applicant: Apptio, Inc., Bellevue, WA (US)

(72) Inventor: Tavis Dean Elliott, Bothell, WA (US)

(73) Assignee: Apptio, Inc., Bellevue, WA (US)

( * ) Notice: Subject to any disclaimer, the term of this patent is extended or adjusted under 35 U.S.C. 154(b) by 0 days.

(21) Appl. No.: 14/869,721

(22) Filed: Sep. 29, 2015

(65) Prior Publication Data

US 2017/0091689 A1    Mar. 30, 2017

(51) Int. Cl.
G06Q 10/06    (2012.01)

(52) U.S. Cl.
CPC ... G06Q 10/06315 (2013.01); G06Q 10/0631 (2013.01)

(58) Field of Classification Search
CPC ........................................................ H04L 41/22
See application file for complete search history.

(56) References Cited

U.S. PATENT DOCUMENTS

| | | |
|---|---|---|
| 4,744,026 A | 5/1988 | Vanderbei |
| 5,249,120 A | 9/1993 | Foley |
| 5,615,121 A | 3/1997 | Babayev et al. |
| 5,619,211 A | 4/1997 | Horkin et al. |
| 5,721,919 A | 2/1998 | Morel et al. |
| 5,758,327 A | 5/1998 | Gardner et al. |
| 5,799,286 A | 8/1998 | Morgan et al. |
| 5,802,508 A | 9/1998 | Morgenstern |
| 5,903,453 A | 5/1999 | Stoddard, II |
| 5,970,476 A | 10/1999 | Fahey |
| 5,991,741 A | 11/1999 | Speakman et al. |
| 6,014,640 A | 1/2000 | Bent |
| 6,032,123 A | 2/2000 | Jameson |
| 6,047,290 A | 4/2000 | Kennedy et al. |
| 6,208,993 B1 | 3/2001 | Shadmon |
| 6,249,769 B1 | 6/2001 | Ruffin et al. |

(Continued)

FOREIGN PATENT DOCUMENTS

JP    2011134268 A    7/2011

OTHER PUBLICATIONS

Microsoft Office Excel 2007 AIO Desk Reference for Dummies, ISBN 978-0-470-03738-6.*

(Continued)

*Primary Examiner* — Octavian Rotaru
(74) *Attorney, Agent, or Firm* — John W. Branch; Lowe Graham Jones PLLC

(57) ABSTRACT

Embodiments are directed towards allocating resources in a business system. A data model that includes a plurality data objects may be generated, such that each data object includes a plurality of data object line items. Allocation rules that allocate resources between the data objects may be generated. The allocation rules may be employed to identify key features of data objects, such that the key features are used by the allocation rules to allocate resources.
If key features are identified, grouped objects that separately correspond to the data objects that include key features may be generated. Also, grouped object line items may be generated for each of the grouped objects based on each distinct value of the key features, such that the data object line items are collapsed into grouped object line items based on the distinct values of the key features.

28 Claims, 12 Drawing Sheets

(56) References Cited

U.S. PATENT DOCUMENTS

| | | |
|---|---|---|
| 6,253,192 B1 | 6/2001 | Corlett et al. |
| 6,308,166 B1 | 10/2001 | Breuker et al. |
| 6,321,207 B1 | 11/2001 | Ye |
| 6,330,552 B1 | 12/2001 | Farrar et al. |
| 6,424,969 B1 | 7/2002 | Gruenwald |
| 6,507,825 B2 | 1/2003 | Suh |
| 6,578,005 B1 | 6/2003 | Lesaint et al. |
| 6,594,672 B1 | 7/2003 | Lampson et al. |
| 6,647,370 B1 | 11/2003 | Fu et al. |
| 6,738,736 B1 | 5/2004 | Bond |
| 6,789,252 B1 | 9/2004 | Burke et al. |
| 6,832,212 B1 | 12/2004 | Zenner et al. |
| 6,839,719 B2 | 1/2005 | Wallace |
| 6,877,034 B1 | 4/2005 | Machin et al. |
| 6,882,630 B1 | 4/2005 | Seaman |
| 6,965,867 B1 | 11/2005 | Jameson |
| 6,983,321 B2 | 1/2006 | Trinon et al. |
| 7,050,997 B1 | 5/2006 | Wood, Jr. |
| 7,130,822 B1 | 10/2006 | Their et al. |
| 7,149,700 B1 | 12/2006 | Munoz et al. |
| 7,177,850 B2 | 2/2007 | Argenton et al. |
| 7,263,527 B1 | 8/2007 | Malcolm |
| 7,305,491 B2 | 12/2007 | Miller et al. |
| 7,308,427 B1 | 12/2007 | Hood |
| 7,321,869 B1 | 1/2008 | Phibbs, Jr. |
| 7,386,535 B1 | 6/2008 | Kalucha et al. |
| 7,418,438 B2 | 6/2008 | Gould et al. |
| 7,505,888 B2 | 3/2009 | Legault et al. |
| 7,590,937 B2 | 9/2009 | Jacobus et al. |
| 7,634,431 B2 | 12/2009 | Stratton |
| 7,653,449 B2 | 1/2010 | Hunter et al. |
| 7,664,729 B2 | 2/2010 | Klein et al. |
| 7,703,003 B2 | 4/2010 | Payne et al. |
| 7,725,343 B2 | 5/2010 | Johanson et al. |
| 7,742,961 B2 | 6/2010 | Aaron et al. |
| 7,752,077 B2 | 7/2010 | Holden et al. |
| 7,761,548 B2 | 7/2010 | Snyder et al. |
| 7,769,654 B1 | 8/2010 | Hurewitz |
| 7,774,458 B2 | 8/2010 | Trinon et al. |
| 7,783,759 B2 | 8/2010 | Eilam et al. |
| 7,801,755 B2 | 9/2010 | Doherty et al. |
| 7,805,400 B2 | 9/2010 | Teh et al. |
| 7,813,948 B2 | 10/2010 | Ratzloff |
| 7,852,711 B1 | 12/2010 | Fitzgerald et al. |
| 7,870,051 B1 | 1/2011 | En et al. |
| 7,877,742 B2 | 1/2011 | Duale et al. |
| 7,899,235 B1 | 3/2011 | Williams et al. |
| 7,917,555 B2 | 3/2011 | Gottumukkala et al. |
| 7,930,396 B2 | 4/2011 | Trinon et al. |
| 7,933,861 B2 | 4/2011 | Zadorozhny |
| 7,945,489 B2 | 5/2011 | Weiss et al. |
| 7,966,235 B1 | 6/2011 | Capelli et al. |
| 7,966,266 B2 | 6/2011 | Delvat |
| 8,010,584 B1 | 8/2011 | Craver et al. |
| 8,024,241 B2 | 9/2011 | Bailey et al. |
| 8,073,724 B2 | 12/2011 | Harthcryde et al. |
| 8,121,959 B2 | 2/2012 | Delvat |
| 8,175,863 B1 | 5/2012 | Ostermeyer et al. |
| 8,195,524 B2 | 6/2012 | Sandholm et al. |
| 8,195,785 B2 | 6/2012 | Snyder et al. |
| 8,200,518 B2 | 6/2012 | Bailey et al. |
| 8,200,561 B1 | 6/2012 | Scott et al. |
| 8,209,218 B1 | 6/2012 | Basu et al. |
| 8,214,829 B2 | 7/2012 | Neogi et al. |
| 8,260,959 B2 | 9/2012 | Rudkin et al. |
| 8,370,243 B1 | 2/2013 | Cernyar |
| 8,396,775 B1 | 3/2013 | Mindlin |
| 8,423,428 B2 | 4/2013 | Grendel et al. |
| 8,484,355 B1 | 7/2013 | Lochhead et al. |
| 8,533,904 B2 | 9/2013 | Conrad |
| 8,543,438 B1 | 9/2013 | Fleiss |
| 8,600,830 B2 | 12/2013 | Hoffberg |
| 8,601,263 B1 | 12/2013 | Shankar et al. |
| 8,606,827 B2 | 12/2013 | Williamson |
| 8,655,714 B2 | 2/2014 | Weir et al. |
| 8,667,385 B1 | 3/2014 | Mui et al. |
| 8,766,981 B2 | 7/2014 | McLachlan et al. |
| 8,768,976 B2 | 7/2014 | McLachlan et al. |
| 8,826,230 B1 | 8/2014 | Michelsen |
| 8,935,301 B2 | 1/2015 | Chmiel et al. |
| 8,937,618 B2 | 1/2015 | Erez et al. |
| 8,970,476 B2 | 3/2015 | Chan |
| 8,996,552 B2 | 3/2015 | Mukes et al. |
| 9,015,692 B1 | 4/2015 | Clavel |
| 9,020,830 B2 | 4/2015 | Purpus et al. |
| 9,104,661 B1 | 8/2015 | Evans |
| 9,213,573 B2 | 12/2015 | French et al. |
| 9,281,012 B2 | 3/2016 | Hedges |
| 9,384,511 B1 | 7/2016 | Purpus |
| 9,529,863 B1 | 12/2016 | Gindin et al. |
| 9,805,311 B1 | 10/2017 | Mohler |
| 10,152,722 B2 | 12/2018 | Heath |
| 2002/0002557 A1 | 1/2002 | Straube et al. |
| 2002/0016752 A1 | 2/2002 | Suh |
| 2002/0056004 A1 | 5/2002 | Smith |
| 2002/0069102 A1 | 6/2002 | Vellante et al. |
| 2002/0082966 A1 | 6/2002 | O'Brien et al. |
| 2002/0087441 A1 | 7/2002 | Wagner, Jr. et al. |
| 2002/0107914 A1 | 8/2002 | Charisius et al. |
| 2002/0123945 A1 | 9/2002 | Booth et al. |
| 2002/0145040 A1 | 10/2002 | Grabski, III |
| 2002/0156710 A1 | 10/2002 | Ryder |
| 2002/0174006 A1 | 11/2002 | Rugge et al. |
| 2002/0174049 A1 | 11/2002 | Kitahara |
| 2002/0178198 A1 | 11/2002 | Steele |
| 2002/0194329 A1 | 12/2002 | Alling |
| 2003/0019350 A1 | 1/2003 | Khosia |
| 2003/0074269 A1* | 4/2003 | Viswanath ............ G06Q 30/06 705/26.82 |
| 2003/0083388 A1 | 5/2003 | L'Alloret |
| 2003/0083888 A1 | 5/2003 | Argenton et al. |
| 2003/0083912 A1 | 5/2003 | Covington et al. |
| 2003/0093310 A1 | 5/2003 | Macrae |
| 2003/0110113 A1 | 6/2003 | Martin |
| 2003/0139960 A1 | 7/2003 | Nishikawa et al. |
| 2003/0139986 A1 | 7/2003 | Roberts, Jr. |
| 2003/0158724 A1 | 8/2003 | Uchida |
| 2003/0158766 A1 | 8/2003 | Mital et al. |
| 2003/0172018 A1 | 9/2003 | Chen et al. |
| 2003/0172368 A1 | 9/2003 | Alumbaugh et al. |
| 2003/0195780 A1 | 10/2003 | Arora et al. |
| 2003/0208493 A1 | 11/2003 | Hall et al. |
| 2003/0217033 A1 | 11/2003 | Sandler et al. |
| 2003/0233301 A1 | 12/2003 | Chen et al. |
| 2003/0236721 A1 | 12/2003 | Plumer et al. |
| 2004/0030628 A1 | 2/2004 | Takamoto et al. |
| 2004/0039685 A1 | 2/2004 | Hambrecht et al. |
| 2004/0059611 A1 | 3/2004 | Kananghinis et al. |
| 2004/0059679 A1 | 3/2004 | Mizumachi et al. |
| 2004/0073477 A1 | 4/2004 | Heyns et al. |
| 2004/0093344 A1 | 5/2004 | Berger et al. |
| 2004/0111509 A1 | 6/2004 | Eilam et al. |
| 2004/0133676 A1 | 7/2004 | Sproule |
| 2004/0138942 A1 | 7/2004 | Pearson et al. |
| 2004/0186762 A1 | 9/2004 | Beaven et al. |
| 2004/0243438 A1 | 12/2004 | Mintz |
| 2004/0249737 A1 | 12/2004 | Tofte |
| 2005/0004856 A1 | 1/2005 | Brose et al. |
| 2005/0033631 A1 | 2/2005 | Wefers et al. |
| 2005/0038788 A1 | 2/2005 | Dettinger et al. |
| 2005/0044224 A1 | 2/2005 | Jun et al. |
| 2005/0060298 A1 | 3/2005 | Agapi et al. |
| 2005/0060317 A1 | 3/2005 | Lott et al. |
| 2005/0071285 A1 | 3/2005 | Laicher et al. |
| 2005/0091102 A1 | 4/2005 | Retsina |
| 2005/0120032 A1 | 6/2005 | Liebich et al. |
| 2005/0131870 A1 | 6/2005 | Krishnaswamy et al. |
| 2005/0131929 A1 | 6/2005 | Bailey |
| 2005/0144110 A1 | 6/2005 | Chen et al. |
| 2005/0171918 A1 | 8/2005 | Eden et al. |
| 2005/0235020 A1 | 10/2005 | Gabelmann et al. |
| 2005/0246482 A1 | 11/2005 | Gabelmann et al. |
| 2006/0010156 A1 | 1/2006 | Netz et al. |
| 2006/0010294 A1 | 1/2006 | Pasumansky et al. |

(56) References Cited

U.S. PATENT DOCUMENTS

| | | |
|---|---|---|
| 2006/0041458 A1 | 2/2006 | Ringrose et al. |
| 2006/0041501 A1 | 2/2006 | Tabata et al. |
| 2006/0059032 A1 | 3/2006 | Wong et al. |
| 2006/0074980 A1 | 4/2006 | Sarkar |
| 2006/0080264 A1 | 4/2006 | Zhang et al. |
| 2006/0085302 A1 | 4/2006 | Weiss et al. |
| 2006/0085465 A1 | 4/2006 | Nori et al. |
| 2006/0106658 A1 | 5/2006 | Johanson et al. |
| 2006/0116859 A1 | 6/2006 | Legault et al. |
| 2006/0116975 A1 | 6/2006 | Gould et al. |
| 2006/0126552 A1 | 6/2006 | Lee et al. |
| 2006/0136281 A1 | 6/2006 | Peters et al. |
| 2006/0143219 A1 | 6/2006 | Smith et al. |
| 2006/0161879 A1 | 7/2006 | Lubrecht et al. |
| 2006/0167703 A1 | 7/2006 | Yakov |
| 2006/0178960 A1 | 8/2006 | Lepman |
| 2006/0179012 A1 | 8/2006 | Jacobs |
| 2006/0190497 A1 | 8/2006 | Inturi et al. |
| 2006/0200400 A1 | 9/2006 | Hunter et al. |
| 2006/0200477 A1 | 9/2006 | Barrenechea |
| 2006/0212146 A1 | 9/2006 | Johnson et al. |
| 2006/0212334 A1 | 9/2006 | Jackson |
| 2006/0224740 A1* | 10/2006 | Sievers-Tostes ...... G06F 9/5038 709/226 |
| 2006/0224946 A1 | 10/2006 | Barrett et al. |
| 2006/0228654 A1 | 10/2006 | Sanjar et al. |
| 2006/0235785 A1 | 10/2006 | Chait et al. |
| 2006/0259468 A1 | 11/2006 | Brooks et al. |
| 2006/0277074 A1 | 12/2006 | Einav et al. |
| 2006/0282429 A1 | 12/2006 | Hernandez-Sherrington et al. |
| 2007/0038494 A1 | 2/2007 | Kreitzbert et al. |
| 2007/0088641 A1 | 4/2007 | Aaron et al. |
| 2007/0113289 A1 | 5/2007 | Blumenau |
| 2007/0118516 A1 | 5/2007 | Li et al. |
| 2007/0124162 A1 | 5/2007 | Mekyska |
| 2007/0129892 A1 | 6/2007 | Smartt et al. |
| 2007/0179975 A1 | 8/2007 | Teh et al. |
| 2007/0185785 A1 | 8/2007 | Carlson et al. |
| 2007/0198317 A1 | 8/2007 | Harthcryle et al. |
| 2007/0198982 A1 | 8/2007 | Bolan et al. |
| 2007/0214413 A1 | 9/2007 | Boeckenhauer |
| 2007/0226064 A1 | 9/2007 | Yu et al. |
| 2007/0226090 A1 | 9/2007 | Stratton |
| 2007/0233439 A1 | 10/2007 | Carroll et al. |
| 2007/0260532 A1 | 11/2007 | Blake, III |
| 2007/0265896 A1 | 11/2007 | Smith |
| 2007/0271203 A1 | 11/2007 | Delvat |
| 2007/0276755 A1 | 11/2007 | Rapp |
| 2007/0282626 A1 | 12/2007 | Zhang et al. |
| 2008/0027957 A1 | 1/2008 | Bruckner et al. |
| 2008/0033774 A1 | 2/2008 | Kimbrel et al. |
| 2008/0059945 A1 | 3/2008 | Sauer et al. |
| 2008/0060058 A1 | 3/2008 | Shea et al. |
| 2008/0065435 A1 | 3/2008 | Ratzloff |
| 2008/0071844 A1 | 3/2008 | Gopal et al. |
| 2008/0082186 A1 | 4/2008 | Hood et al. |
| 2008/0082435 A1 | 4/2008 | O'Brien et al. |
| 2008/0120122 A1 | 5/2008 | Olenski et al. |
| 2008/0201269 A1 | 8/2008 | Hollins et al. |
| 2008/0201297 A1 | 8/2008 | Choi et al. |
| 2008/0208647 A1 | 8/2008 | Hawley et al. |
| 2008/0208667 A1 | 8/2008 | Lymbery et al. |
| 2008/0222638 A1 | 9/2008 | Beaty et al. |
| 2008/0239393 A1 | 10/2008 | Navon |
| 2008/0255912 A1 | 10/2008 | Christiansen et al. |
| 2008/0295096 A1 | 11/2008 | Beaty et al. |
| 2008/0312979 A1 | 12/2008 | Lee et al. |
| 2008/0319811 A1 | 12/2008 | Casey |
| 2009/0012986 A1 | 1/2009 | Arazi et al. |
| 2009/0013325 A1 | 1/2009 | Kobayashi et al. |
| 2009/0018880 A1 | 1/2009 | Bailey et al. |
| 2009/0063251 A1 | 3/2009 | Rangarajan et al. |
| 2009/0063540 A1 | 3/2009 | Mattox et al. |
| 2009/0100017 A1 | 4/2009 | Graves et al. |
| 2009/0100406 A1 | 4/2009 | Greenfield et al. |
| 2009/0144120 A1 | 6/2009 | Ramachandran |
| 2009/0150396 A1 | 6/2009 | Elisha et al. |
| 2009/0195350 A1 | 6/2009 | Tsern et al. |
| 2009/0199192 A1 | 6/2009 | Laithwaite et al. |
| 2009/0198535 A1 | 8/2009 | Brown et al. |
| 2009/0210275 A1 | 8/2009 | Andreev et al. |
| 2009/0216580 A1 | 8/2009 | Bailey et al. |
| 2009/0222742 A1 | 9/2009 | Pelton et al. |
| 2009/0234892 A1 | 9/2009 | Anglin et al. |
| 2009/0300173 A1 | 12/2009 | Bakman et al. |
| 2009/0319316 A1 | 12/2009 | Westerfeld et al. |
| 2010/0005014 A1 | 1/2010 | Castle et al. |
| 2010/0005173 A1 | 1/2010 | Baskaran et al. |
| 2010/0017344 A1 | 1/2010 | Hambrecht et al. |
| 2010/0042455 A1 | 2/2010 | Liu et al. |
| 2010/0049494 A1 | 2/2010 | Radibratovic et al. |
| 2010/0082380 A1 | 4/2010 | Merrifield, Jr. et al. |
| 2010/0094740 A1 | 4/2010 | Richter |
| 2010/0125473 A1 | 5/2010 | Tung et al. |
| 2010/0153282 A1 | 6/2010 | Graham |
| 2010/0161371 A1 | 6/2010 | Cantor et al. |
| 2010/0161634 A1 | 6/2010 | Caceres |
| 2010/0169477 A1 | 7/2010 | Stienhans et al. |
| 2010/0185557 A1 | 7/2010 | Hunter et al. |
| 2010/0198750 A1 | 8/2010 | Ron et al. |
| 2010/0211667 A1 | 8/2010 | O'Connell, Jr. |
| 2010/0250419 A1 | 9/2010 | Ariff et al. |
| 2010/0250421 A1 | 9/2010 | Ariff et al. |
| 2010/0250642 A1 | 9/2010 | Yellin et al. |
| 2010/0293163 A1 | 11/2010 | McLachlan et al. |
| 2010/0299233 A1 | 11/2010 | Licardi et al. |
| 2010/0306382 A1 | 12/2010 | Cardosa et al. |
| 2010/0323754 A1 | 12/2010 | Nakagawa |
| 2010/0325506 A1 | 12/2010 | Cai et al. |
| 2010/0325606 A1 | 12/2010 | Sundararajan |
| 2010/0332262 A1 | 12/2010 | Horvitz et al. |
| 2010/0333109 A1 | 12/2010 | Milnor |
| 2011/0016214 A1 | 1/2011 | Jackson |
| 2011/0016448 A1 | 1/2011 | Bauder et al. |
| 2011/0022861 A1 | 1/2011 | Agneeswaran et al. |
| 2011/0066472 A1 | 3/2011 | Scheider |
| 2011/0066628 A1 | 3/2011 | Jayaraman |
| 2011/0072340 A1* | 3/2011 | Miller ................... G06F 17/246 715/220 |
| 2011/0106691 A1 | 5/2011 | Clark et al. |
| 2011/0107254 A1 | 5/2011 | Moroze |
| 2011/0167034 A1 | 7/2011 | Knight et al. |
| 2011/0196795 A1 | 8/2011 | Pointer |
| 2011/0238608 A1 | 8/2011 | Sathish |
| 2011/0225277 A1 | 9/2011 | Freimuth et al. |
| 2011/0295766 A1 | 12/2011 | Tompkins |
| 2011/0313947 A1 | 12/2011 | Grohovaz |
| 2012/0016811 A1 | 1/2012 | Jones |
| 2012/0023170 A1 | 1/2012 | Matignon et al. |
| 2012/0066020 A1 | 3/2012 | Moon et al. |
| 2012/0116990 A1 | 5/2012 | Huang |
| 2012/0131591 A1 | 5/2012 | Moorthi et al. |
| 2012/0150736 A1 | 6/2012 | Dickerson et al. |
| 2012/0185368 A1 | 7/2012 | Schloter et al. |
| 2012/0232947 A1* | 9/2012 | McLachlan ............ G06Q 10/06 705/7.23 |
| 2012/0233217 A1 | 9/2012 | Purpus et al. |
| 2012/0233547 A1 | 9/2012 | McLachlan |
| 2012/0239739 A1 | 9/2012 | Manglik et al. |
| 2012/0246046 A1 | 9/2012 | Hirsch |
| 2012/0272234 A1 | 10/2012 | Kaiser et al. |
| 2012/0330869 A1 | 12/2012 | Durham |
| 2013/0028537 A1 | 1/2013 | Miyake et al. |
| 2013/0041792 A1 | 2/2013 | King et al. |
| 2013/0041819 A1 | 2/2013 | Khasho |
| 2013/0060595 A1 | 3/2013 | Bailey |
| 2013/0066866 A1 | 3/2013 | Chan et al. |
| 2013/0091456 A1 | 4/2013 | Sherman et al. |
| 2013/0091465 A1 | 4/2013 | Kikin-Gil et al. |
| 2013/0103369 A1 | 4/2013 | Huynh et al. |
| 2013/0103654 A1 | 4/2013 | McLachlan et al. |
| 2013/0124454 A1 | 5/2013 | Bhide et al. |
| 2013/0124459 A1 | 5/2013 | Iwase et al. |
| 2013/0138470 A1 | 5/2013 | Goyal et al. |

(56) References Cited

U.S. PATENT DOCUMENTS

| | | |
|---|---|---|
| 2013/0173159 A1 | 7/2013 | Trum et al. |
| 2013/0179371 A1 | 7/2013 | Jain et al. |
| 2013/0201193 A1 | 8/2013 | McLachlan et al. |
| 2013/0227584 A1 | 8/2013 | Greene et al. |
| 2013/0268307 A1 | 10/2013 | Li et al. |
| 2013/0282537 A1 | 10/2013 | Snider |
| 2013/0290470 A1 | 10/2013 | CaraDonna et al. |
| 2013/0293551 A1 | 11/2013 | Erez et al. |
| 2013/0339274 A1 | 12/2013 | Willis et al. |
| 2013/0346390 A1 | 12/2013 | Jerzak et al. |
| 2014/0006085 A1 | 1/2014 | McLachlan et al. |
| 2014/0006222 A1 | 1/2014 | Hericks et al. |
| 2014/0067632 A1 | 3/2014 | Curtis |
| 2014/0075004 A1 | 3/2014 | Van Dusen et al. |
| 2014/0089509 A1 | 3/2014 | Akolkar et al. |
| 2014/0122374 A1 | 5/2014 | Hacigumus et al. |
| 2014/0129583 A1 | 5/2014 | Munkes et al. |
| 2014/0136295 A1 | 5/2014 | Wasser |
| 2014/0143175 A1 | 5/2014 | Greenshields et al. |
| 2014/0172918 A1 | 6/2014 | Kornmann et al. |
| 2014/0229212 A1 | 8/2014 | MacElheron et al. |
| 2014/0244364 A1 | 8/2014 | Evers |
| 2014/0252095 A1 | 9/2014 | Kikin |
| 2014/0257928 A1 | 9/2014 | Chen et al. |
| 2014/0278459 A1 | 9/2014 | Morris |
| 2014/0279121 A1 | 9/2014 | George et al. |
| 2014/0279201 A1 | 9/2014 | Iyoob et al. |
| 2014/0279676 A1 | 9/2014 | Schafer et al. |
| 2014/0279947 A1 | 9/2014 | Chachra et al. |
| 2014/0288987 A1 | 9/2014 | Liu |
| 2014/0310233 A1 | 10/2014 | Catalano et al. |
| 2014/0337007 A1 | 11/2014 | Waibel et al. |
| 2014/0351166 A1 | 11/2014 | Schlossberg |
| 2014/0365503 A1 | 12/2014 | Franceschini et al. |
| 2014/0365504 A1 | 12/2014 | Franceschini et al. |
| 2015/0006552 A1 | 1/2015 | Lord |
| 2015/0012328 A1 | 1/2015 | McLachlan et al. |
| 2015/0046363 A1 | 2/2015 | McNamara et al. |
| 2015/0066808 A1 | 3/2015 | Legare et al. |
| 2015/0074075 A1 | 3/2015 | Alexander |
| 2015/0088584 A1 | 3/2015 | Santiago, III et al. |
| 2015/0227991 A1 | 8/2015 | Yu |
| 2015/0294273 A1 | 10/2015 | Barraci et al. |
| 2015/0302303 A1 | 10/2015 | Hakim |
| 2015/0341230 A1 | 11/2015 | Dave et al. |
| 2015/0363725 A1 | 12/2015 | Anderson et al. |
| 2015/0379061 A1 | 12/2015 | Paraschivescu |
| 2016/0063577 A1 | 3/2016 | Yellin et al. |
| 2016/0098234 A1 | 4/2016 | Weaver et al. |
| 2017/0102246 A1 | 3/2017 | Yang |
| 2018/0068246 A1 | 3/2018 | Crivat et al. |

OTHER PUBLICATIONS

Cable et al, Project Portfolio Earned Value Management using Treemaps, archives-org, 2004 http://www.cs.umd.edu/hcil/treemap/PROJECT%20MANAGEMENT-ASPUBLISHED.pdf.*

Visualization for Production Management Treemap and Fisheye Table Browser open-video organization webpages 2001 http://www.open-video.org/details.php?videoid=4547.*

Official Communication for U.S. Appl. No. 13/452,628 dated Nov. 18, 2013.

Official Communication for U.S. Appl. No. 14/033,130 dated Dec. 16, 2013.

Official Communication for U.S. Appl. No. 13/324,253 dated Jan. 23, 2014.

Official Communication for U.S. Appl. No. 13/675,837 dated Jan. 31, 2014.

Official Communication for U.S. Appl. No. 13/917,503 dated Jan. 31, 2014.

Robinson Glen, Cloud Economics—Cost Optimization (selected slides), Amazon Web Services AWS, SlideShare, Feb. 28, 2012 http://www.slideshare.net/AmazonWebServices/whats-new-with-aws-london.

Skilton et al. Building Return on Investment from Cloud Computing, The open Group Whitepaper, mladina webpages, Apr. 2010 http://www.mladina.si/media/objave/dokumenti/2010/5/31/31_5_2010_open_group_building_return-on-investment-from-cloud-computing.pdf.

Ward Miles, Optimizing for Cost in the Cioud (selection): AWS Summit, Slideshare Apr. 2012 http://www.slideshare.net/AmazonWebServices/optimizing-your-infrastructure-costs-on-aws.

Amazon Reserved Instances, Amazon Web Services, archives org, Jan. 14, 2013 http://web.archive.org/web/2012011453849/http://aws.amazon.com/rds/reserved-instances/?.

Cost Optimisation with Amazon Web Services, extracted slides. Slideshare Jan. 30, 2012 http://www.slideshare.net/AmazonWebServices/cost-optimisation-with-amazon-web-services?from_search=1.

Deciding an Approach to the cloud AWS Reserved Instances Cloudyn webpages, Feb. 28, 2012 https://www.cloudyn.com/blog/deciding-an-approach-to-the-cloud-aws-reserved-aws.

Ganesan Harish. Auto Scaling using AWS, Amazon Web Services AWS (selected slides), Apr. 20, 2011 http://www.slideshare.net/harishganesan/auto-scaling-using-amazon-web-services-aws.

Office Communication for U.S. Appl. No. 13/415,797 dated Apr. 9, 2014.

Office Communication for U.S. Appl. No. 13/324,253 dated Apr. 9, 2014.

Office Communication for U.S. Appl. No. 13/324,253 dated Oct. 24, 2014.

Office Communication for U.S. Appl. No. 13/365,150 dated Dec. 3, 2014.

Office Communication for U.S. Appl. No. 13/452,628 dated Oct. 1, 2014.

Office Communication for U.S. Appl. No. 13/837,815 dated Apr. 7, 2014.

Office Communication for U.S. Appl. No. 13/675,837 dated Jan. 31, 2014.

Office Communication for U.S. Appl. No. 13/675,837 dated Apr. 2, 2014.

Office Communication for U.S. Appl. No. 13/917,503 dated Apr. 3, 2014.

Office Communication for U.S. Appl. No. 13/935,147 dated Apr. 11, 2014.

Office Communication for U.S. Appl. No. 13/935,147 dated Jun. 16, 2014.

Office Communication for U.S. Appl. No. 14/033,130 dated May 27, 2014.

Office Communication for U.S. Appl. No. 14/033,130 dated Aug. 5, 2014.

Office Communication for U.S. Appl. No. 14/180,308 dated Jan. 30, 2015.

Office Communication for U.S. Appl. No. 14/180,308 dated Apr. 8, 2014.

Office Communication for U.S. Appl. No. 13/452,628 dated Mar. 13, 2014.

SAS Activity-Based Management, 2010, Fact Sheet, 4 pages.

Office Communication for U.S. Appl. No. 14/180,308 dated Sep. 2, 2014.

Office Communication for U.S. Appl. No. 14/180,308 dated Apr. 17, 2015.

Extended European Search Report in EP Application No. 14159413.5 dated Jul. 4, 2014.

Office Communication for U.S. Appl. No. 13/415,797 dated Jan. 12, 2015.

Office Communication for U.S. Appl. No. 13/837,815 dated Sep. 25, 2014.

Office Communication for U.S. Appl. No. 13/324,253 dated Feb. 19, 2015.

Henriet et al. "Traffic-Based Cost Allocation in a Network." The Rand Journal of Economics, 1996, pp. 332-345.

Rudnick et al., "Marginal Pricing and Supplement Cost Allocation in Transmission Open Access." Power Systems, IEEE Transactions on 10.2, 1995, pp. 1125-1132.

(56) References Cited

OTHER PUBLICATIONS

Office Communication for U.S. Appl. No. 13/949,019 dated Feb. 10, 2015.
European Search Report for Application No. 12755613.2 dated Jan. 26 2015.
Office Communication for U.S. Appl. No. 13/452,628 dated Mar. 30, 2015.
Office Communication for U.S. Appl. No. 13/917,503 dated Apr. 16, 2015.
Office Communication for U.S. Appl. No. 13/675,837 dated Apr. 16, 2015.
Office Communication for U.S. Appl. No. 13/837,815 dated Apr. 27, 2015.
Office Communication for U.S. Appl. No. 13/452,628 dated Jun. 23, 2015.
Office Communication for U.S. Appl. No. 13/415,797 dated Jul. 23, 2015.
International Search Report and Written Opinion for PCT/US2015/015486 dated Jun. 29, 2015.
Office Communication for U.S. Appl. No. 13/935,147 dated Jul. 9, 2015.
Office Communication for U.S. Appl. No. 13/415,797 dated Oct. 19, 2015.
Office Communication for U.S. Appl. No. 13/837,815 dated Sep. 28, 2015.
"Activity Based Costing is the best allocation methodology," APPTIO, Community for Technology Business Management, Mar. 16, 2010, 2 pages.
"Amazon Elastic Computer Cloud (Amazon EC2)", archive.org, Oct. 21, 2011, 9 pages http://web.archive.org/web/20111029130914/http://aws.amazon.com/ec2/#pricing.
"Apptio Extends Leadership in Cloud Business Management with Launch of Apptio Cloud Express," Apptio, Dec. 12, 2012, 2 pages http://www.apptio.com/news/apptio-extends-leadership-cloud-business-management-launch-apptio-cloud-express#. Ukm4r8X7Lco.
"Apptio Optimizes Enterprise IT Costs Utilizing Amazon Web Services Cloud Computing," Apptio, Apr. 7, 2009, 2 pages http://www.apptio.com/news/apptio-optimizes-enterprise-it-costs-utilizing-amazon-web-services-cloud-computing#. Ukm5XsX7Lco.
"Automating Cost Transparency," Apptio, 2008, 15 pages htto://www.cio.com/documents/whitepapers/AutomatedCostTransparency.pdf.
"Cloud Computing and Sustainability: The Environmental Benefits of Moving to the Cloud," Accenture, archive.org, Aug. 31, 2011, 17 pages http://web.archive.org/web/20110813022626/http://www.accenture.com/SiteCollectionDocuments/PDF/Accenture_Sustainability_Cloud_Computing_TheEnvironmentalBenefitsofMovingtotheCloud.pdf.
"IT Cost Transparency and Apptio," Dec. 4, 2008, 2 pages http://web.archive.org/web/20081204012158/http://www.apptio.com/solutions.
"Notice from the European Patent Office dated Oct. 1, 2007 concerning business methods," Official Journal EPO, dated Nov. 2007, pp. 592-593.
"Program Evaluation and Review Technique," Wikipedia, the free encyclopedia, accessed Mar. 13, 2012, 10 pages http://en.wikipedia.org/wiki/Program_Evaluation_and_Review_Technique—last modified Mar. 12, 2012.
"Project Management," Wikipedia, the free encyclopedia, accessed Mar. 13, 2012 14 pages http://en.wikipedia.org/wiki/Project_management—last modified Mar. 7, 2012.
"Visualization for Production Management: Treemap and Fisheye Table Browser," Open-Video Organization webpages, 2001, 2 pages http://www.open-video.org/details.php?videoid.4547.
Busch, J., "Six Strategies for IT Cost Allocation," Spend Matters, Jan. 5, 2011, 3 pages http://spendmatters.com/2011/01/05/six-strategies-for-it-cost-allocation/.
Morgan, T. P., "Apptio puffs up freebie cost control freak for public clouds." The Register, Dec. 12, 2012, 2 pages http://www.theregister.co.uk/2012/12/12/apptio_cloud_express.
Ricknäs, M., "Apptio unveils tool to keep track of cloud costs," ComputerWorld, Dec. 12, 2012, 1 page http://www.computerworld.com/s/article/9234630/Apptio_unveils_tool_to_keep_track_of_cloud_costs.
Talbot, C., "Apptio Cloud Express Provides Free Usage Tracking Service." talkincloud.com, Dec. 12, 2012, 4 pages http://talkincloud.com/cloud-computing-management/apptio-cloud-express-provides-free-usage-tracking-service.
Vizard, M., "Free Service from Apptio Tracks Cloud Service Provider Pricing," IT Business Edge, Dec. 12, 2012, 6 pages http://www.itbusinessedge.com/blogs/it-unmasked/free-service-from-apptio-tracks-cloud-service-provider-pricing.html.
International Search Report and Written Opinion for International Patent Application No. PCT/US2010/035021 dated Jul. 14, 2010.
International Preliminary Report on Patentability for International Patent Application No. PCT/US2010/035021 dated Nov. 24, 2011.
International Search Report and Written Opinion for International Patent Application No. PCT/US2012/028353 dated Oct. 31, 2012.
International Preliminary Report on Patentability for International Patent Application No. PCT/US2012/028353 dated Sep. 19, 2013.
International Search Report and Written Opinion for International Patent Application No. PCT/US2012/028378 dated Sep. 12, 2012.
International Preliminary Report on Patentability for International Patent Application No. PCT/US2012/028378 dated Sep. 19, 2013.
Extended European Search Report in EP Application No. 13151967.0/1955, dated Apr. 19, 2013.
Official Communication for U.S. Appl. No. 12/467,120 dated Oct. 4, 2011.
Official Communication for U.S. Appl. No. 12/467,120 dated Jun. 20, 2012.
Official Communication for U.S. Appl. No. 12/467,120 dated Aug. 29, 2012.
Official Communication for U.S. Appl. No. 12/467,120 dated Oct. 23, 2013.
Official Communication for U.S. Appl. No. 12/467,120 dated Mar. 26, 2013.
Official Communication for U.S. Appl. No. 13/324,253 dated Sep. 25, 2012.
Official Communication for U.S. Appl. No. 13/324,253 dated Jan. 10, 2013.
Official Communication for U.S. Appl. No. 13/324,253 dated Mar. 19, 2013.
Official Communication for U.S. Appl. No. 13/324,253 dated Sep. 6, 2013.
Official Communication for U.S. Appl. No. 13/415,797 dated Oct. 3, 2013.
Official Communication for U.S. Appl. No. 13/452,628 dated Apr. 22, 2013.
Official Communication for U.S. Appl. No. 13/675,837 dated Oct. 10, 2013.
Official Communication for U.S. Appl. No. 13/837,815 dated Oct. 23, 2013.
Official Communication for U.S. Appl. No. 13/917,478 dated Nov. 7, 2013.
Official Communication for U.S. Appl. No. 13/917,503 dated Oct. 10, 2013.
Official Communication for U.S. Appl. No. 13/935,147 dated Oct. 22, 2013.
Office Communication for U.S. Appl. No. 13/649,019 dated Sep. 23, 2015.
Office Communication for U.S. Appl. No. 13/365,150 dated Sep. 24. 2015.
Office Communication for U.S. Appl. No. 14/033,130 dated Sep. 15, 2015.
Official Communication for U.S. Appl. No. 13/452,628 dated Jan. 12, 2016, 21 pages.
Official Communication for U.S. Appl. No. 13/649,019 dated Jan. 4, 2016, 8 pages.
European Examination Report for Applicant No. 14159413.5 dated Jul. 15, 2015, 9 pages.
Office Communication for U.S. Appl. No. 13/415,701 dated Oct. 27, 2015, 16 pages.

(56) References Cited

OTHER PUBLICATIONS

Office Communication for U.S. Appl. No. 14/846,349 dated Dec. 17, 2015, 23 pages.
Office Communication for U.S. Appl. No. 13/675,837 dated Oct. 26, 2015, 20 pages.
Office Communication for U.S. Appl. No. 13/917,503 dated Oct. 22, 2015, 19 pages.
Office Communication for U.S. Appl. No. 14/722,663 dated Dec. 1, 2015, 37 pages.
Chien-Liang Fok et al., "Rapid Development and Flexible Deployment of Adaptive Wireless Sensor Network Applications," Proceedings of the 25th IEEE international Conference on Distributed Computing Systems, 2005, pp. 653-662 (10 pages).
Frans Flippo et al., "A Framework for Rapid Development of Multimodal Interfaces," Proceedings of the 5th International Conference on Multimodal Interfaces, 2003, pp. 109-116 (8 pages).
David B. Stewart et al., "Rapid Development of Robotic Applications Using Component-Based Real-Time Software," Intelligent Robots and Systems 1995, Human Robot interaction and Cooperative Robots Proceedings, 1995, IEEE International Conference on vol. 1, pp. 465-470 (6 pages).
Office Communication for U.S. Appl. No. 13/365,150 dated Dec. 7, 2015, 3 pages.
Official Communication for U.S. Appl. No. 13/935,147 dated Mar. 9, 2016, 10 pages.
Official Communication for U.S. Appl. No. 14/033,130 dated Feb. 18, 2016, 22 pages.
International Search Report and Written Opinion for PCT/US2015/048697 dated Mar. 31, 2016, 9 pages.
Office Communication for U.S. Appl. No. 13/365,150, dated Apr. 6, 2016, 11 pages.
Office Communication for U.S. Appl. No. 14/722,663, dated Mar. 31, 2016, 5 pages.
Van Diessen et al., "Component Business Model for Digital Repositories: A Framework for Analysis," AAAI, 2008, 7 pages.
Melcher et al., "Visualization and Clustering of Business Process Collections Based on Process Metric Values," IEEE Computer Society, 2008, 4 pages.
Lee et al., "Value-Centric, Model-Driven Business Transformation," IEEE, 2008, 8 pages.
Lee et al., "Business Transformation Workbench: A Practitioner's Tool for Business Transformation," IEEE International Conference on Services Computing, 2008, 8 pages.
Risch et al., "Interactive Information Visualization for Exploratory Intelligence Data Analysis," IEEE Proceedings of VRAIS, 1996, 10 pages.
Office Communication for U.S. Appl. No. 13/415,797, dated Apr. 4, 2016, 24 pages.
Office Communication for U.S. Appl. No. 13/837,815, dated Apr. 13, 2016, 22 pages.
Official Communication for U.S. Appl. No. 13/415,797 dated Jan. 11, 2017.
Official Communication for U.S. Appl. No. 13/675,837 dated Jan. 11, 2017.
Official Communication for U.S. Appl. No. 13/917,503 dated Jan. 12, 2017.
Official Communication for U.S. Appl. No. 14/033,130 dated Jan. 11, 2017.
Official Communication for U.S. Appl. No. 14/867,552 dated Jan. 9, 2017.
Official Communication for U.S. Appl. No. 15/351,313 dated Jan. 12, 2017.
Official Communication for U.S. Appl. No. 13/837,815 dated Nov. 9, 2016, 11 pages.
Official Communication for U.S. Appl. No. 15/260,221 dated Dec. 20, 2016, 21 pages.
Official Communication for U.S. Appl. No. 15/271,013 dated Dec. 15, 2016, 50 pages.
Office Communication for U.S. Appl. No. 14/867,552, dated Apr. 25, 2016, 12 pages.
Office Communication for U.S. Appl. No. 14/033,130, dated Apr. 25, 2016, 4 pages.
Office Communication for U.S. Appl. No. 14/971,944, dated May 19, 2016, 17 pages.
Stephen Muller and Hasso Platner, "An IN-Depth Analysis of Data Aggregation Cost Factors in a Columnar In-Memory Database", ACM DOLAP'12, Nov. 2, 2012, Maui, Hawaii, USA, pp. 65-72.
Official Communication for U.S. Appl. No. 13/365,150 dated Oct. 24, 2016, 19 pages.
Official Communication for U.S. Appl. No. 14/977,368 dated Jun. 7, 2016, 11 pages.
Official Communication for U.S. Appl. No. 13/837,815 dated Jun. 23, 2016, 3 pages.
Official Communication for U.S. Appl. No. 14/846,349 dated Jul. 1, 2016, 24 pages.
Official Communication for U.S. Appl. No. 14/981,747 dated Jul. 14, 2016, 29 pages.
Official Communication for U.S. Appl. No. 14/977,368 dated Oct. 19, 2016, 5 pages.
Official Communication for U.S. Appl. No. 13/452,628 dated Aug. 18, 2016, 22 pages.
Official Communication for U.S. Appl. No. 14/867,552 dated Oct. 3, 2016, 19 pages.
Official Communication for U.S. Appl. No. 14/180,308 dated Oct. 19, 2016, 22 pages.
Official Communication for U.S. Appl. No. 15/379,267 dated Mar. 10, 2017, 11 pages.
Official Communication for U.S. Appl. No. 13/415,797 dated Apr. 14, 2017, 3 pages.
Official Communication for U.S. Appl. No. 13/415,797 dated Jan. 11, 2017, 25 pages.
Official Communication for U.S. Appl. No. 13/675,837 dated Jan. 11, 2017, 29 pages.
Efficient frontier—Wikipedia, Efficient frontier, Wikipedia webpages, Oct. 30, 2016, https://en.wikipedia.org/wiki/Efficient_frontier, 2 pages.
Official Communication for U.S. Appl. No. 13/917,503 dated Jan. 12, 2017, 27 pages.
Official Communication for U.S. Appl. No. 14/033,130 dated Jan. 11, 2017, 12 pages.
Official Communication for U.S. Appl. No. 14/867,552 dated Jan. 9, 2017, 3 pages.
Official Communication for U.S. Appl. No. 15/351,313 dated Jan. 12, 2017, 7 pages.
Official Communication for U.S. Appl. No. 13/837,815 dated Nov. 9, 2016.
Official Communication for U.S. Appl. No. 15/260,221 dated Dec. 20, 2016.
Official Communication for U.S. Appl. No. 15/271,013 dated Dec. 15, 2016.
Office Communication for U.S. Appl. No. 14/867,552, dated Apr. 25, 2016.
Office Communication for U.S. Appl. No. 14/033,130, dated Apr. 25, 2016.
Office Communication for U.S. Appl. No. 14/971,944, dated May 19, 2016.
Official Communication for U.S. Appl. No. 14/977,368 dated Jun. 7, 2016.
Official Communication for U.S. Appl. No. 13/837,815 dated Jun. 23, 2016.
Official Communication for U.S. Appl. No. 14/846,349 dated Jul. 1, 2016.
Official Communication for U.S. Appl. No. 14/981,747 dated Jul. 14, 2016.
Official Communication for U.S. Appl. No. 14/867,552 dated Oct. 3, 2016.
Official Communication for U.S. Appl. No. 14/180,308 dated Oct. 19, 2016.
Official Communication for U.S. Appl. No. 14/977,368 dated Oct. 19, 2016.
Official Communication for U.S. Appl. No. 13/365,150 dated Oct. 24, 2016.
Official Communication for U.S. Appl. No. 13/452,628 dated Aug. 18, 2016.

(56) References Cited

OTHER PUBLICATIONS

Official Communication for U.S. Appl. No. 14/180,308 dated Feb. 8, 2017, 3 pages.
Official Communication for U.S. Appl. No. 14/846,349 dated Mar. 1, 2017, 27 pages.
Official Communication for U.S. Appl. No. 13/935,147 dated Mar. 7, 2017, 12 pages.
Official Communication for U.S. Appl. No. 13/365,150 dated Mar. 15, 2017, 19 pages.
Official Communication for U.S. Appl. No. 13/452,628 dated Mar. 9, 2017, 24 pages.
Official Communication for U.S. Appl. No. 13/917,503 dated May 16, 2017.
Official Communication for U.S. Appl. No. 13/365,150 dated May 22, 2017.
Official Communication for U.S. Appl. No. 14/981,747 dated May 19, 2017.
Official Communication for U.S. Appl. No. 15/271,013 dated May 24, 2017.
Official Communication for U.S. Appl. No. 14/180,308 dated May 25, 2017.
Official Communication for U.S. Appl. No. 13/365,150 dated May 22, 2017, 3 pages.
Official Communication for U.S. Appl. No. 13/917,503 dated May 16, 2017, 29 pages.
Official Communication for U.S. Appl. No. 14/981,747 dated May 19, 2017, 43 pages.
Official Communication for U.S. Appl. No. 15/271,013 dated May 24, 2017, 37 pages.
Official Communication for U.S. Appl. No. 15/351,313 dated Jul. 18, 2017, 15 pages.
Official Communication for U.S. Appl. No. 15/260,221 dated Aug. 15, 2017, 21 pages.
Official Communication for U.S. Appl. No. 13/365,150 dated Aug. 23, 2017, 30 pages.
Official Communication for European Application No. 13151967.0 dated Aug. 18, 2017, 7 pages.
European Search Report for European Application No. 10775648.8 dated Mar. 10, 2017, 6 pages.
Official Communication for European Application No. 12755613.2 dated Aug. 17, 2017, 7 pages.
Official Communication for U.S. Appl. No. 14/033,130 dated Sep. 7, 2017, 3 pages.
Official Communication for U.S. Appl. No. 14/846,349 dated Sep. 8, 2017, 25 pages.
Official Communication for U.S. Appl. No. 13/452,628 dated Sep. 28, 2017, 26 pages.
Official Communication for U.S. Appl. No. 13/837,815 dated Sep. 28, 2017, 9 pages.
Official Communication for U.S. Appl. No. 13/415,797 dated Sep. 7, 2017, 26 pages.
Official Communication for U.S. Appl. No. 15/379,267 dated Jun. 30, 2017, 16 pages.
Official Communication for U.S. Appl. No. 14/867,552 dated Jun. 29, 2017, 31 pages.
Official Communication for U.S. Appl. No. 14/033,130 dated Jun. 29, 2017, 18 pages.
Official Communication for U.S. Appl. No. 13/837,815 dated Jun. 12, 2017, 12 pages.
Official Communication for U.S. Appl. No. 14/867,552 dated Nov. 29, 2017.
Official Communication for U.S. Appl. No. 14/981,747 dated Dec. 12, 2017.
Official Communication for U.S. Appl. No. 14/033,130 dated Dec. 20, 2017.
Official Communication for U.S. Appl. No. 14/180,308 dated Dec. 22, 2017.
Official Communication for U.S. Appl. No. 15/271,013 dated Dec. 27, 2017.
Official Communication for U.S. Appl. No. 15/260,221 dated Jan. 9, 2018.
Official Communication for U.S. Appl. No. 15/379,267 dated Jan. 2, 2018.
Official Communication for U.S. Appl. No. 15/351,313 dated Jan. 8, 2018.
Official Communication for U.S. Appl. No. 14/846,349 dated Jan. 18, 2018.
Official Communication for U.S. Appl. No. 13/935,147 dated Jan. 17, 2018.
Official Communication for U.S. Appl. No. 15/379,267 dated Oct. 6, 2017.
Official Communication for U.S. Appl. No. 15/859,008 dated Mar. 5, 2018.
Official Communication for U.S. Appl. No. 14/846,349 dated Nov. 20, 2017.
Official Communication for U.S. Appl. No. 13/917,503 dated Nov. 28, 2017.
Official Communication for U.S. Appl. No. 13/837,815 dated Jan. 26, 2018.
Official Communication for U.S. Appl. No. 13/935,147 dated Nov. 3, 2017.
Official Communication for U.S. Appl. No. 14/867,552 dated Feb. 13, 2018.
Official Communication for U.S. Appl. No. 14/867,552 dated Nov. 29, 2017, 12 pages.
Official Communication for U.S. Appl. No. 14/981,747 dated Dec. 12, 2017, 44 pages.
Official Communication for U.S. Appl. No. 14/033,130 dated Dec. 20, 2017, 12 pages.
Official Communication for U.S. Appl. No. 14/180,308 dated Dec. 22, 2017, 18 pages.
Official Communication for U.S. Appl. No. 15/271,013 dated Dec. 27, 2017, 35 pages.
Official Communication for U.S. Appl. No. 15/260,221 dated Jan. 9, 2018, 21 pages.
Official Communication for U.S. Appl. No. 15/379,267 dated Jan. 2, 2018, 15 pages.
Official Communication for U.S. Appl. No. 15/351,313 dated Jan. 8, 2018, 11 pages.
Official Communication for U.S. Appl. No. 14/846,349 dated Jan. 18, 2018, 29 pages.
Official Communication for U.S. Appl. No. 13/935,147 dated Nov. 3, 2017, 11 pages.
Official Communication for U.S. Appl. No. 15/379,267 dated Oct. 6, 2017, 3 pages.
Official Communication for U.S. Appl. No. 15/859,008 dated Mar. 5, 2018, 20 pages.
Official Communication for U.S. Appl. No. 14/846,349 dated Nov. 20, 2017, 3 pages.
Official Communication for U.S. Appl. No. 13/917,503 dated Nov. 28, 2017, 26 pages.
Official Communication for U.S. Appl. No. 13/837,815 dated Jan. 26, 2018, 12 pages.
Official Communication for U.S. Appl. No. 14/867,552 dated Feb. 13, 2018, 3 pages.
Official Communication for U.S. Appl. No. 13/935,147 dated Jan. 17, 2018, 3 pages.
Official Communication for U.S. Appl. No. 13/917,503 dated Jul. 19, 2018.
Official Communication for U.S. Appl. No. 14/846,349 dated Jul. 20, 2018.
Official Communication for U.S. Appl. No. 14/981,747 dated Jul. 5, 2018.
Official Communication for U.S. Appl. No. 15/271,013 dated Jul. 6, 2018.
Official Communication for U.S. Appl. No. 15/379,267 dated Jul. 19, 2018.
Official Communication for U.S. Appl. No. 13/917,503 dated May 10, 2018, pp. 1-38.
Official Communication for U.S. Appl. No. 13/837,815 dated Apr. 5, 2018, pp. 1-4.

(56) References Cited

OTHER PUBLICATIONS

Official Communication for U.S. Appl. No. 14/867,552 dated May 31, 2018, pp. 1-22.
Official Communication for U.S. Appl. No. 15/351,313 dated Jun. 4, 2018, pp. 1-9.
Official Communication for U.S. Appl. No. 15/858,945 dated Apr. 4, 2018, pp. 1-74.
Official Communication for U.S. Appl. No. 15/859,058 dated May 14, 2018, pp. 1-76.
Official Communication for U.S. Appl. No. 13/935,147 dated Apr. 5, 2018, pp. 1-14.
Official Communication for U.S. Appl. No. 13/935,147 dated Aug. 10, 2018, pp. 1-25.
Official Communication for U.S. Appl. No. 14/033,130 dated Aug. 9, 2018, pp. 1-47.
Official Communication for U.S. Appl. No. 15/858,945 dated Sep. 10, 2018, pp. 1-25.
Official Communication for U.S. Appl. No. 15/859,008 dated Jul. 31, 2018, pp. 1-28.
Official Communication for U.S. Appl. No. 14/180,308 dated Aug. 6, 2018, pp. 1-23.
Official Communication for U.S. Appl. No. 13/935,147 dated Aug. 10, 2018.
Official Communication for U.S. Appl. No. 14/033,130 dated Aug. 9, 2018.
Official Communication for U.S. Appl. No. 15/858,945 dated Sep. 10, 2018.
Official Communication for U.S. Appl. No. 15/859,008 dated Jul. 31, 2018.
Official Communication for U.S. Appl. No. 14/180,308 dated Aug. 6, 2018.
Official Communication for U.S. Appl. No. 13/917,503 dated Jul. 19, 2018, pp. 1-3.
Official Communication for U.S. Appl. No. 14/846,349 dated Jul. 20, 2018, pp. 1-40.
Official Communication for U.S. Appl. No. 14/981,747 dated Jul. 5, 2018, pp. 1-62.
Official Communication for U.S. Appl. No. 15/271,013 dated Jul. 6, 2018, pp. 1-49.
Official Communication for U.S. Appl. No. 15/379,267 dated Jul. 19, 2018, pp. 1-34.
Official Communication for U.S. Appl. No. 13/917,503 dated Apr. 1, 2019.
Official Communication for U.S. Appl. No. 13/935,147 dated Mar. 28, 2019.
Official Communication for U.S. Appl. No. 14/033,130 dated Apr. 10, 2019.
Official Communication for U.S. Appl. No. 14/180,308 dated Feb. 26, 2019.
Official Communication for U.S. Appl. No. 14/867,552 dated Feb. 11, 2019.
Official Communication for U.S. Appl. No. 14/981,747 dated Dec. 26, 2018.
Official Communication for U.S. Appl. No. 15/260,221 dated Jan. 8, 2019.
Official Communication for U.S. Appl. No. 15/271,013 dated Mar. 28, 2019.
Official Communication for U.S. Appl. No. 15/351,313 dated Apr. 1, 2019.
Official Communication for U.S. Appl. No. 15/585,945 dated Feb. 6, 2019.
Official Communication for U.S. Appl. No. 15/859,058 dated Mar. 25, 2019.
Official Communication for U.S. Appl. No. 14/033,130 dated Dec. 18, 2018.
Official Communication for U.S. Appl. No. 14/867,552 dated Nov. 21, 2018.
Official Communication for U.S. Appl. No. 15/260,221 dated Oct. 5, 2018.
Official Communication for U.S. Appl. No. 15/379,267 dated Oct. 18, 2018.
Official Communication for U.S. Appl. No. 15/271,013 dated Dec. 18, 2018.
Official Communication for U.S. Appl. No. 15/859,058 dated Dec. 5, 2018.
Official Communication for U.S. Appl. No. 15/859,008 dated Apr. 12, 2019.
Official Communication for U.S. Appl. No. 13/917,503 dated Apr. 1, 2019, pp. 1-34.
Official Communication for U.S. Appl. No. 13/935,147 dated Mar. 28, 2019, pp. 1-16.
Official Communication for U.S. Appl. No. 14/033,130 dated Apr. 10, 2019, pp. 1-9.
Official Communication for U.S. Appl. No. 14/180,308 dated Feb. 26, 2019, pp. 1-28.
Official Communication for U.S. Appl. No. 14/867,552 dated Feb. 11, 2019, pp. 1-8.
Official Communication for U.S. Appl. No. 14/981,747 dated Dec. 26, 2018, pp. 1-50.
Official Communication for U.S. Appl. No. 15/260,221 dated Jan. 8, 2019, pp. 1-19.
Official Communication for U.S. Appl. No. 15/271,013 dated Mar. 28, 2019, pp. 1-53.
Official Communication for U.S. Appl. No. 15/351,313 dated Apr. 1, 2019, pp. 1-31.
Official Communication for U.S. Appl. No. 15/585,945 dated Feb. 6, 2019, pp. 1-15.
Official Communication for U.S. Appl. No. 15/859,058 dated Mar. 25, 2019, pp. 1-24.
Official Communication for U.S. Appl. No. 14/033,130 dated Dec. 18, 2018, pp. 1-11.
Official Communication for U.S. Appl. No. 14/867,552 dated Nov. 21, 2018, pp. 1-37.
Official Communication for U.S. Appl. No. 15/260,221 dated Oct. 5, 2018, pp. 1-40.
Official Communication for U.S. Appl. No. 15/379,267 dated Oct. 18, 2018, pp. 1-9.
Official Communication for U.S. Appl. No. 15/271,013 dated Dec. 18, 2018, pp. 1-47.
Official Communication for U.S. Appl. No. 15/859,058 dated Dec. 5, 2018, pp. 1-20.
Official Communication for U.S. Appl. No. 15/859,008 dated Apr. 12, 2019, pp. 1-19.

* cited by examiner

| GL Actuals.ID | Cost |
|---|---|
| 301, Payroll (IT OPERATIONS) | $237,000 |
| 330, Employee Benefits (IT OPERATIONs) | $49,000 |
| 320, Payroll Taxes (IT OPERATIONS) | $4,100 |
| 760, Repairs (IT OPERATIONS) | $18,000 |
| 759, Rent Equipment (IT OPERATIONS) | $18,000 |
| 711, Fees and Consulting (IT OPERATIONS) | $7,600 |
| 650, Training (IT OPERATIONS) | $6,200 |
| 777, Miscellaneous Expense | $1,800 |

CONTINUOUSLY VARIABLE RESOLUTION OF RESOURCE ALLOCATION

TECHNICAL FIELD

The present invention relates generally to computer automated activity based budget modeling, forecasting and cost accounting, and more particularly, but not exclusively to improving performance for generating report information.

BACKGROUND

Businesses that strive to remain viable and successful in today's competitive commercial environment are required to adopt accurate and responsive budgeting practices. To improve efficiency, businesses use financial models that apply modern budgeting, forecasting and cost accounting techniques. For some accounting techniques, the complexity of the financial allocation model may increase as the number of tracked activities and elements increases. Therefore, for larger enterprises, sophisticated computer programs and computers are often required to assist in generating useful and relevant budgets based on financial allocation models.

In some cases, the large number of items and entities required for financial modeling can make development of modeling applications difficult. Historically, the size and complexity of these financial allocation models have made it difficult to accurately ascertain a total cost of ownership for an offering such as a product and/or service. Further, the size and complexity of modern financial allocation models can make it difficult to generate reporting information based on the model. Thus, it is with respect to these considerations and others that the invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. For a better understanding of the present invention, reference will be made to the following Description of the Various Embodiments, which is to be read in association with the accompanying drawings, wherein.

DESCRIPTION OF THE VARIOUS EMBODIMENTS

Figure 1:
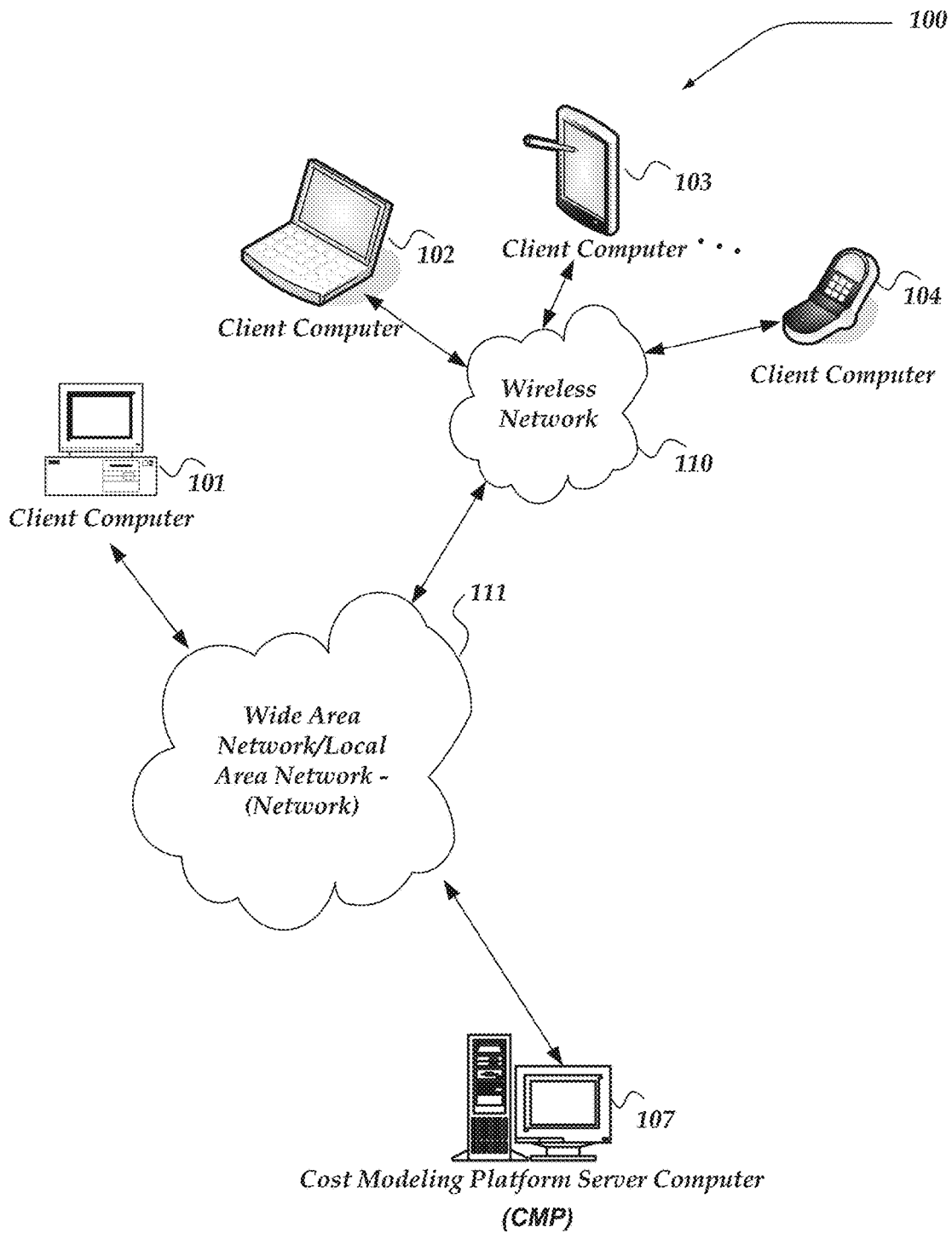
FIG. 1 illustrates a system diagram showing components of an environment in which at least one of the various embodiments may be practiced.

The present innovations now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "In one of the embodiments" or "in at least one of the various embodiments" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "Financial allocation model," "data model", and "cost model" refers to a graph based representation of a system of resource allocation rules and/or financial allocation rules that may be used for costing actual expenditures (for management accounting),budgeting future expenditures, or modeling any type of quantitative resource (e.g., energy, power consumption, money, utilities, or the like). Nodes in the model may represent classes of items that may be associated with costs, expenses, resource generation, resource consumption, or the like. The edges of the graph may represent how the resources, such as, costs and/or expenses may be allocated between the nodes. A data model may be represented using a visual rendering of a graph showing the nodes and the edges connecting the nodes.

As used herein, the terms "cost line item," or "line item" refer to a single line item in a data model and/or a budget (or finance allocation model) and its associated cost/expense in terms of resources. For example, the costs associated with a particular computer that is an email server may be a single item having a particular cost (e.g., the email server may correspond to a cost line item).

As used herein, the terms "category," or "data object" refer to a set and/or class of cost line items that may be grouped together. Also, dataset information in fields of a dataset template may be mapped to one or more categories in a category template. For example, a collection of computers performing services such as email, web serving, enterprise resource planning, may represent separate cost line items and they may be grouped into the Servers category and/or data object.

As used herein, the terms "allocation rules," "entity propagation rules," or "propagation rules" refer to rules in the financial data model that determine how the costs/expenses (e.g., resources) from a category are apportioned between/among other categories. Also, such rules may be assigned to individual cost line items. For example, if an email server cost line item has a value of $1000, an allocation or entity propagation rule may be defined such that 50% of the expense may be allocated to the Marketing department and 50% may be allocated to the Engineering department. Also, allocation rules may be applied at the category as well as the cost line item level.

As used herein, the term "assignment ratios," refers to the distribution ratio of resources, such as, costs that are allocated from a source object in a data model to a target object in the data model. The assignment ratios describe how resources flow from cost line items in the source object to cost line items in the target object. For example, if a model has a Server object allocating $1000 to a Department object, the assignment ratios describe how the $1000 is allocated from the cost line items (particular servers) in the Server object to the cost line items in the Department object (particular departments). Accordingly, for example, if the Servers object (the source object) includes a cost line item for an Email Server that allocates $800 to the Engineering Department and $200 to the Marketing Department, the assignment ratio for Email Server to Engineering Department may be 0.8 ($800/$1000) and the assignment ratio for Email Server to Marketing Department may by 0.2 $200/$1000). Assignment ratios may be explicitly defined by allocation rules. Or they may be derived based on the amount resources/costs that may be allocated from the source object cost line items to the target object cost line items.

As used herein, the terms "business system" and/or "generated business system," refers to a system that has been generated using the budget and forecasting platform. Various embodiments disclosed herein may be related to financial applications. But, one of ordinary skill in the art will appreciate that generated business systems are not limited to financial applications.

As used herein, the term "dataset" refers to a collection of data, usually presented in tabular form. Each column may represent a particular variable. Each row may represent a given member of the dataset. Also, it may list values for fields for each of the variables, such as name, location, cost, owner, manufacturer, serial number, or the like. Non-tabular datasets can also take the form of marked up strings of characters, such as an XML file.

As used herein, the term "total cost value" refers to a value that is determined for providing at least one offering. A model for determining the total cost value (in terms of resources) of at least one offering is based at least on an allocation of cost data to at least one category in a category template in a cost model.

As used herein, the term "target object," or "target data object" refers to an object in a data model that may be allocated resource values (e.g., costs/expenses) from one or more other objects (source objects). In at least one of the various embodiments, target objects may be used to represent one or more categories in a data model.

As used herein, the term "source object," or "source data object" refers to an object in a data model that may be providing resource values (e.g., costs/expenses) that may be allocated to one or more other objects (target objects). In at least one of the various embodiments, source objects may be used to represent one or more categories in a data model.

As used herein the term "key feature" refers to a feature of a category or data object that is used by allocation rules to determine how resources are allocated. Data objects may have many features, however, in most cases only one or a few features are used in allocation rules allocate resources to and/or from a data object. These few features are key features.

As used herein the term "grouped object" refers to an object in the data model that contains line items that correspond to distinct key feature values from the line items in a corresponding data object. When more than line item in the data object have the same values for the key features, those line item may be collapsed into a single line item of the grouped object that corresponds to the data objects.

As used herein the term "data object line item" refers to line items of a data object.

As used herein the term "grouped object line item" refers to line item of a grouped object.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed towards continuously variable resolution of resource allocation that include allocating resources in a business system. In at least one of the various embodiments, a data model that includes a plurality data objects may be generated, such that each data object includes a plurality of data object line items.

In at least one of the various embodiments, a plurality of allocation rules that allocate resources between the two or more of the plurality of data objects may be generated.

In at least one of the various embodiments, the plurality of allocation rules may be employed to identify one or more key features of one or more data objects of the plurality of data objects, such that the one or more key features are used by the allocation rules to allocate resources.

In at least one of the various embodiments, if one or more key features may be identified, one or more grouped objects that separately correspond to one of the one or more data objects that include one or more of the one or more key features may be generated. Also, in at least one of the various embodiments, one or more grouped object line items may be generated for each of the one or more grouped objects based on each distinct value of the one or more key features, such that the data object line items are collapsed into the one or more grouped object line items based on the distinct value of the one or more key features.

In at least one of the various embodiments, one or more assignment ratio tables may be generated based on the allocation rules, such that rows in the one or more assignment ratio tables provide allocations using the grouped object line items. In at least one of the various embodiments, generating the one or more assignment ratio tables, may include employing the one or more grouped object line items to generate one or more rows in the assignment ratio tables, such that, the one or more rows represent the allocation of resources for one or more data objects.

In at least one of the various embodiments, if a query may be provided, at least a portion of the plurality of data objects may be traversed based on the query. And, if a grouped object may be encountered during this traversal, at least a portion of results for the query may be generated using one or more of the grouped object's line items.

In at least one of the various embodiments, one or more values from individual data object line items may be stored in a grouped object line item, such that the one or more values enable the corresponding individual data object line item to be resolved from the grouped object line item.

In at least one of the various embodiments, if a query references one or more features that may be absent from a grouped object, accessing the one or more features directly from a data object that corresponds to the grouped object. In at least one of the various embodiments, identifying one or more of the plurality of data objects that may be used to generate one or more of the grouped objects.

In at least one of the various embodiments, the one or more grouped objects may be updated based on modifications that may be made to one or more of the plurality of allocation rules, wherein the modifications include one or more of an increase in a number of key features, or a decrease in the number of key features.

Illustrated Operating Environment

FIG. 1 shows components of one embodiment of an environment in which at least one of the various embodiments may be practiced. Not all of the components may be required to practice various embodiments, and variations in the arrangement and type of the components may be made. As shown, system 100 of FIG. 1 includes local area networks ("LANs")/wide area networks ("WANs")-(network) 111, wireless network 110, client computer 101-104, and Cost Modeling Platform Server (CMP) 107.

Generally, client computers 102-104 may include virtually any portable computing device capable of receiving and sending a message over a network, such as network 111, wireless network 110, or the like. Client computers 102-104 may also be described generally as client computers that are configured to be portable. Thus, client computers 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDA's), handheld computers, laptop computers, wearable computers, tablet computers, integrated devices combining one or more of the preceding devices, or the like. As such, client computers 102-104 typically range widely in terms of capabilities and features. For example, a cell phone may have a numeric keypad and a few lines of monochrome Liquid Crystal Display (LCD) on which only text may be displayed. In another example, a web-enabled mobile device may have a touch sensitive screen, a stylus, and several lines of color LCD in which both text and graphics may be displayed.

Client computer 101 may include virtually any computing device capable of communicating over a network to send and receive information, including messaging, performing various online actions, or the like. The set of such devices may include devices that typically connect using a wired or wireless communications medium such as personal computers, tablet computers, multiprocessor systems, microprocessor-based or programmable consumer electronics, network Personal Computers (PCs), or the like. In at least one of the various embodiments, at least some of client computers 102-104 may operate over wired and/or wireless network. Today, many of these devices include a capability to access and/or otherwise communicate over a network such as network 111 and/or wireless network 110. Moreover, client computers 102-104 may access various computing applications, including a browser, or other web-based application.

In at least one of the various embodiments, one or more of client computers 101-104 may be configured to operate within a business or other entity to perform a variety of services for the business or other entity. For example, client computers 101-104 may be configured to operate as a web server, an accounting server, a production server, an email server, video game server, an inventory server, or the like. However, client computers 101-104 are not constrained to these services and may also be employed, for example, as an end-user computing node, in other embodiments. Further, it should be recognized that more or less client computers may be included within a system such as described herein, and embodiments are therefore not constrained by the number or type of client computers employed.

A web-enabled client computer may include a browser application that is configured to receive and to send web pages, web-based messages, or the like. The browser application may be configured to receive and display graphics, text, multimedia, or the like, employing virtually any web-based language, including a wireless application protocol messages (WAP), or the like. In at least one of the various embodiments, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, or the like, to display and send a message. In at least one of the various embodiments, a user of the client computer may employ the browser application to perform various actions over a network.

Client computers 101-104 also may include at least one other client application that is configured to receive and/or send data, including budgeting and forecasting information, between another computing device. Client applications may include a capability to provide requests and/or receive data relating to the cost models, budget reports, budget project information, allocation rules, or the like. The client application may provide data representing assignment and/or allocation changes, selecting templates, editing cost allocations between or among categories, generating and/or modifying allocation rules, or the like. In at least one of the various embodiments, client applications may receive and/or generate data related to budgeting and financial models and may generate tables and relationships between and among the data. In at least one of the various embodiments, client computers 101-104 may view and/or modify generated data models.

Wireless network 110 is configured to couple client computers 102-104 and its components with network 111. Wireless network 110 may include any of a variety of wireless sub-networks that may further overlay stand-alone ad-hoc networks, or the like, to provide an infrastructure-oriented connection for client computers 102-104. Such sub-networks may include mesh networks, Wireless LAN (WLAN) networks, cellular networks, or the like.

Wireless network 110 may further include an autonomous system of terminals, gateways, routers, or the like connected by wireless radio links, or the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G), 4th (4G), 5th (5G) generation radio access for cellular systems, WLAN, Wireless Router (WR) mesh, or the like. Access technologies such as 2G, 3G, 4G, 5G, and future access networks may enable wide area coverage for mobile devices, such as client computers 102-104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), High Speed Downlink Packet Access (HSDPA), Long Term Evolution (LTE), or the like. In essence, wireless network 110 may include virtually any wireless communication mechanism by which information may travel between client computers 102-104 and another computing device, network, or the like.

Network 111 is configured to couple network computers with other computing devices, including, CMP 107, client computer(s) 101, and through wireless network 110 to client computers 102-104. Network 111 is enabled to employ any form of computer readable media for communicating information from one electronic device to another. Also, network 111 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. For example, various Internet Protocols (IP), Open Systems Interconnection (OSI) architectures, and/or other communication protocols, architectures, models, and/or standards, may also be employed within network 111 and wireless network 110. Furthermore, remote computers and other related electronic devices could be remotely connected to either LANs or WANs via a modem and temporary telephone link. In essence, network 111 includes any communication method by which information may travel between computing devices.

Additionally, communication media typically embodies computer-readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media. Such communication media is distinct from, however, processor-readable storage devices described in more detail below.

Figure 3:
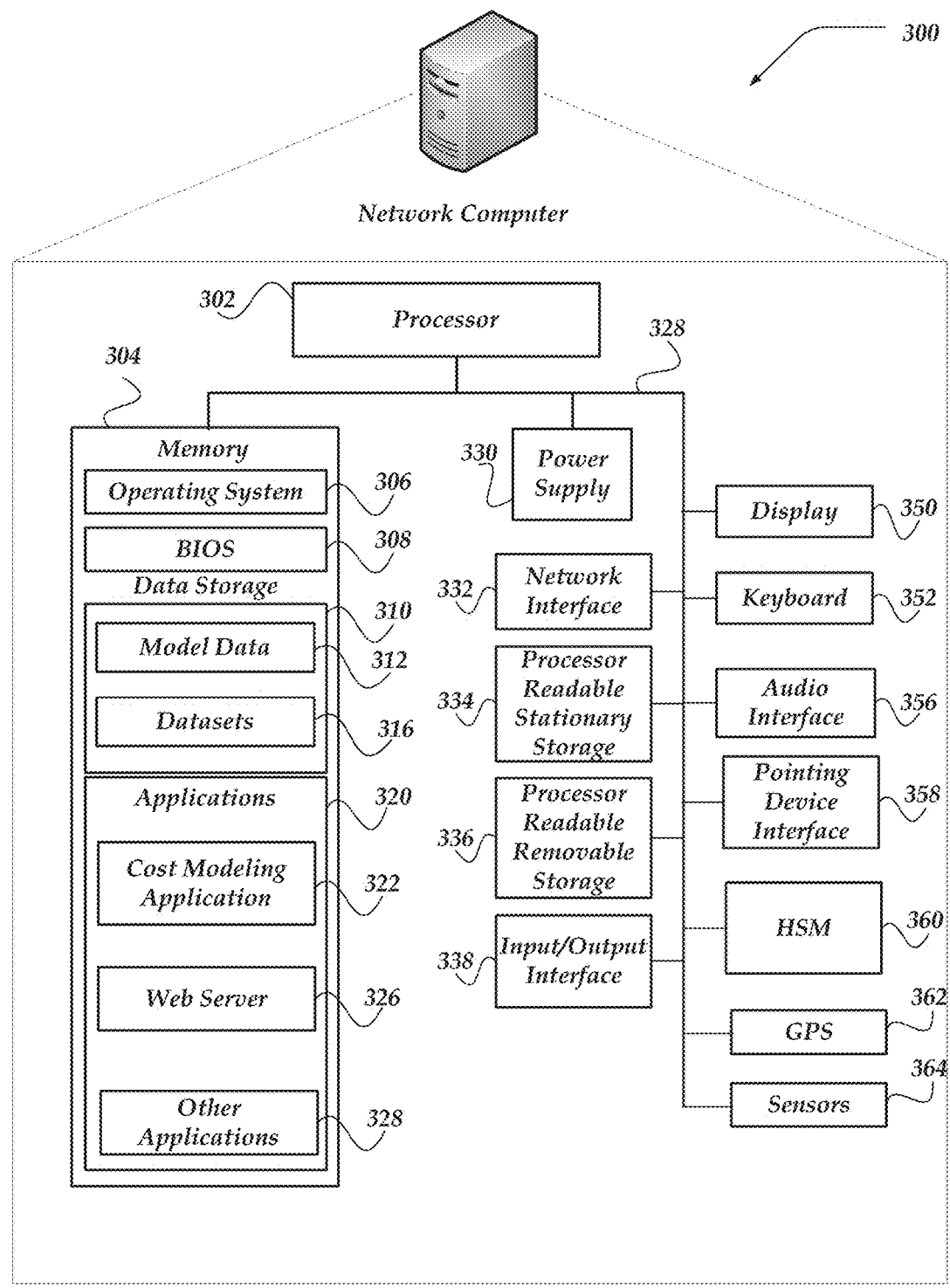
FIG. 3 illustrates one embodiment of a network computer that may be included in a system.

CMP 107 may include virtually any network computer usable to perform data processing operation that may be used for generating cost models, data models, allocation rules, cost allocations, total cost values for offerings, displays and/or reports thereof, such as network computer 300 of FIG. 3. In at least one of the various embodiments, CMP 107 employs various techniques to create, define, generate, and/or automated data processing applications such as budgeting and financial management applications and one or more cost models and/or data models. CMP 107 may include modules for generating data processing applications that may apply models that may include dataset templates, category templates, allocation rules, or the like. Furthermore, CMP 107 may include and/or generate data processing applications for visualizing the generated allocation categories, cost allocations, budgets, cost models, data models, allocation rules, total cost values for offerings, or the like.

Devices that may operate as CMP 107 include various network computers, including, but not limited to personal computers, desktop computers, multiprocessor systems, microprocessor-based or programmable consumer electronics, network PCs, server devices, tablet computers, network appliances, or the like. It should be noted that while CMP 107 is illustrated as a single network computer, the invention is not so limited. Thus, in another embodiment, CMP 107 may represent a plurality of network computers. For example, in at least one of the various embodiments, CMP 107 may be distributed over a plurality of network computers and/or implemented using cloud architecture.

Moreover, CMP 107 is not limited to a particular configuration. Rather, CMP 107 may operate using a controller/worker approach over a plurality of network computers, within a cluster, a peer-to-peer architecture, cloud-based architecture (e.g., virtual machines), and/or any of a variety of other architectures. Thus, CMP Server Computer 107 is not to be construed as being limited to a single environment, and other configurations, and architectures are also envisaged. CMP Server Computer 107 may employ processes and such as described below in conjunction with FIG. 4 and above to perform at least some of its actions.

Illustrative Client Computer

Figure 2:
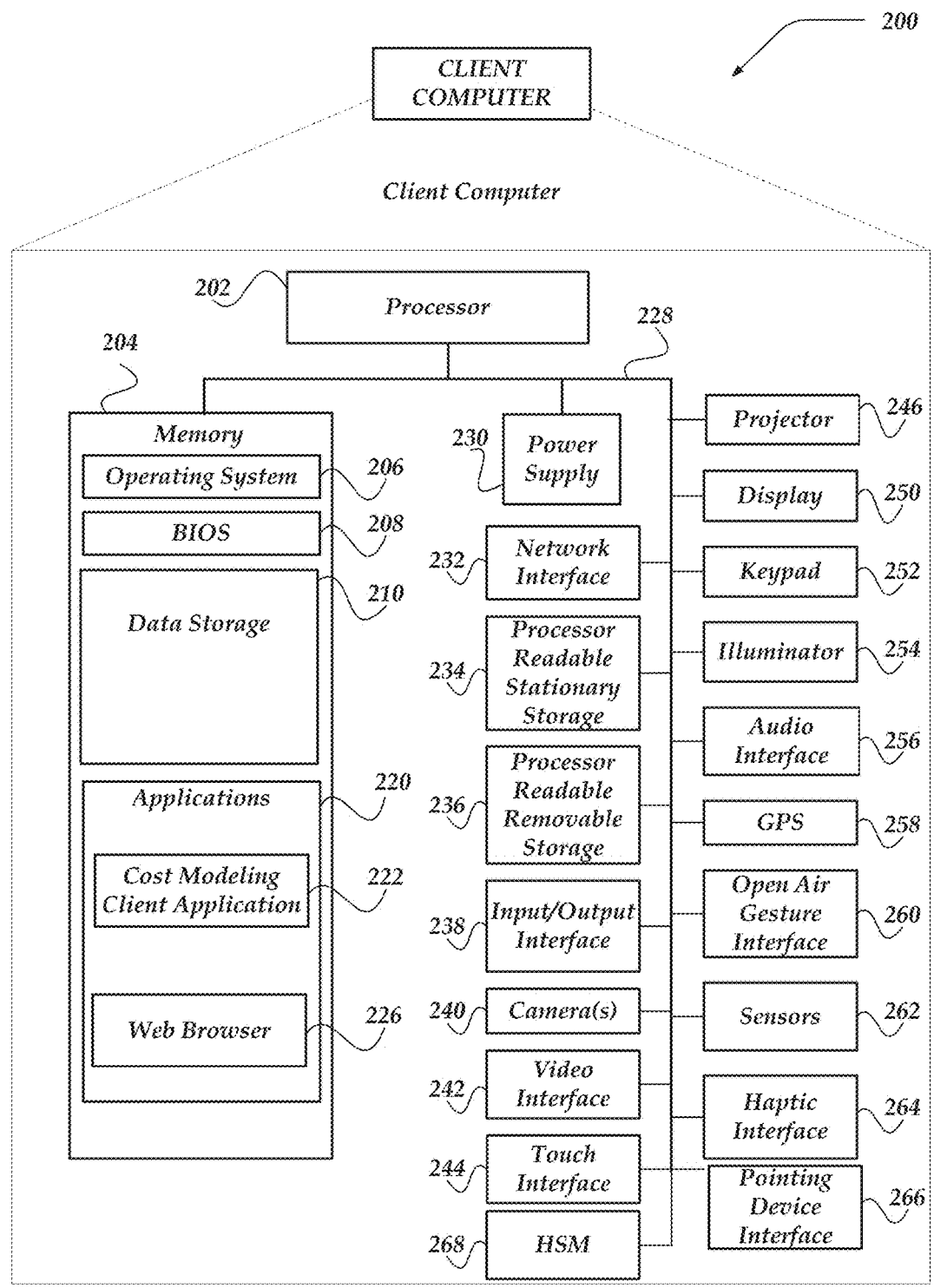
FIG. 2 shows one embodiment of a client computer that may be included in a system.

FIG. 2 shows one embodiment of client computer 200 that may include many more or less components than those shown. Client computer 200 may represent, for example, at least one embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring and/or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements and/or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others and/or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch and/or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication and/or provide light. Illuminator 254 may remain active for specific periods of time or in response to events. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing and/or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, and/or store keys pairs, or the like. In some embodiments, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Haptic interface 264 may be arranged to provide tactile feedback to a user of the client computer. For example, the haptic interface 264 may be employed to vibrate client computer 200 in a particular way when another user of a computer is calling. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

In at least one of the various embodiments, client computer 200 may also include sensors 262 for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), light monitoring, audio monitoring, motion sensors, or the like. Sensors 262 may be one or more hardware sensors that collect and/or measure data that is external to client computer 200

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In at least one embodiment, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input and/or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that may be configured to receive and to send web pages, web-based messages, graphics, text, multimedia, and the like. The client computer's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, and/or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™, or the Symbian® operating system. The operating system may include, or interface with a Java virtual machine module that enables control of hardware components and/or operating system operations via Java application programs.

Memory 204 may further include one or more data storage 210, which can be utilized by client computer 200 to store, among other things, applications 220 and/or other data. For example, data storage 210 may also be employed to store information that describes various capabilities of client computer 200. The information may then be provided to another device or computer based on any of a variety of events, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, and/or otherwise process instructions and data. Applications 220 may include, for example, cost modeling client application 222. In at least one of the various embodiments, cost modeling client application 222 may be used to exchange communications to and from cost modeling platform server computer 107, including, but not limited to, queries, searches, report information, visualization of models, API calls, or the like.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include a hardware microcontroller instead of a CPU. In at least one embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

Illustrative Network Computer

FIG. 3 shows one embodiment of network computer 300 that may be included in a system implementing one or more embodiments of the described innovations. Network computer 300 may include many more or less components than those shown in FIG. 3. However, the components shown are sufficient to disclose an illustrative embodiment for practicing these innovations. Network computer 300 may represent, for example, one embodiment of cost modeling platform server computer 107 of FIG. 1.

As shown in the figure, network computer 300 includes a processor 302 in communication with a memory 304 via a bus 328. Network computer 300 also includes a power supply 330, network interface 332, audio interface 356, global positioning systems (GPS) receiver 362, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others and/or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. Display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

GPS transceiver 362 can determine the physical coordinates of network computer 300 on the surface of the Earth, which typically outputs a location as latitude and longitude values. GPS transceiver 362 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 362 can determine a physical location for network computer 300.

Network computer 300 may also include sensors 364 for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), light monitoring, audio monitoring, motion sensors, or the like. Sensors 364 may be one or more hardware sensors that collect and/or measure data that is external to network computer 300

In at least one embodiment, however, network computer 300 may, through other components, provide other information that may be employed to determine a physical location of the client computer, including for example, a Media Access Control (MAC) address, IP address, and the like.

Human interface components can be physically separate from network computer 300, allowing for remote input and/or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

Memory 304 may include Random Access Memory (RAM), Read-Only Memory (ROM), and/or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's IOS® operating system. The operating system may include, or interface with a Java virtual machine module that enables control of hardware components and/or operating system operations via Java application programs. Likewise, other runtime environments may be included.

Memory 304 may further include one or more data storage 310, which can be utilized by network computer 300 to store, among other things, applications 320 and/or other data. For example, data storage 310 may also be employed to store information that describes various capabilities of network computer 300. The information may then be provided to another device or computer based on any of a variety of events, including being sent as part of a header during a communication, sent upon request, or the like. Data storage 410 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, model data 312, one or more datasets 316, or the like.

Applications 320 may include computer executable instructions which, when executed by network computer 300, transmit, receive, and/or otherwise process messages (e.g., SMS, Multimedia Messaging Service (MMS), Instant Message (IM), email, and/or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include cost modeling application 322, web server application 326, other applications 328, or the like, that may perform actions further described below. In at least one of the various embodiments, one or more of the applications may be implemented as modules and/or components of another application. Further, in at least one of the various embodiments, applications may be implemented as operating system extensions, modules, plugins, or the like.

In at least one of the various embodiments, applications, such as, cost modeling application 322, web server application 326, other applications 328, or the like, may be arranged to employ geo-location information to select one or more localization features, such as, time zones, languages, currencies, calendar formatting, or the like. Localization features may be used in user-interfaces and well as internal processes and/or databases. In at least one of the various embodiments, geo-location information used for selecting localization information may be provided by GPS 362. Also, in some embodiments, geolocation information may include information providing using one or more geolocation protocol over the networks, such as, wireless network 108 and/or network 111.

Furthermore, in at least one of the various embodiments, cost modeling application 322 may be operative in a cloud-based computing environment. In at least one of the various embodiments, these applications, and others, that comprise the management platform may be executing within virtual machines and/or virtual servers that may be managed in a cloud-based based computing environment. In at least one of the various embodiments, in this context the applications may flow from one physical network computer within the cloud-based environment to another depending on performance and scaling considerations automatically managed by the cloud computing environment. Likewise, in at least one of the various embodiments, virtual machines and/or virtual servers dedicated to cost modeling application 322 may be provisioned and de-commissioned automatically.

Also, in at least one of the various embodiments, cost modeling application 322, or the like, may located in virtual servers running in a cloud-based computing environment rather than being tied to one or more specific physical network computers.

Further, network computer 300 may also comprise hardware security module (HSM) 360 for providing additional tamper resistant safeguards for generating, storing and/or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, and/or store keys pairs, or the like. In some embodiments, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include a hardware microcontroller instead of a CPU. In at least one embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

In at least one of the various embodiments, cost modeling application 322 may enable a user to generate budgets, allocation rules, data models, cost models, total cost values for offerings, reports, or the like. Also in at least one of the various embodiments, cost modeling application 322 may employ processes, or parts of processes, similar to those described below.

Illustrative Logical System Architecture

Figure 4:
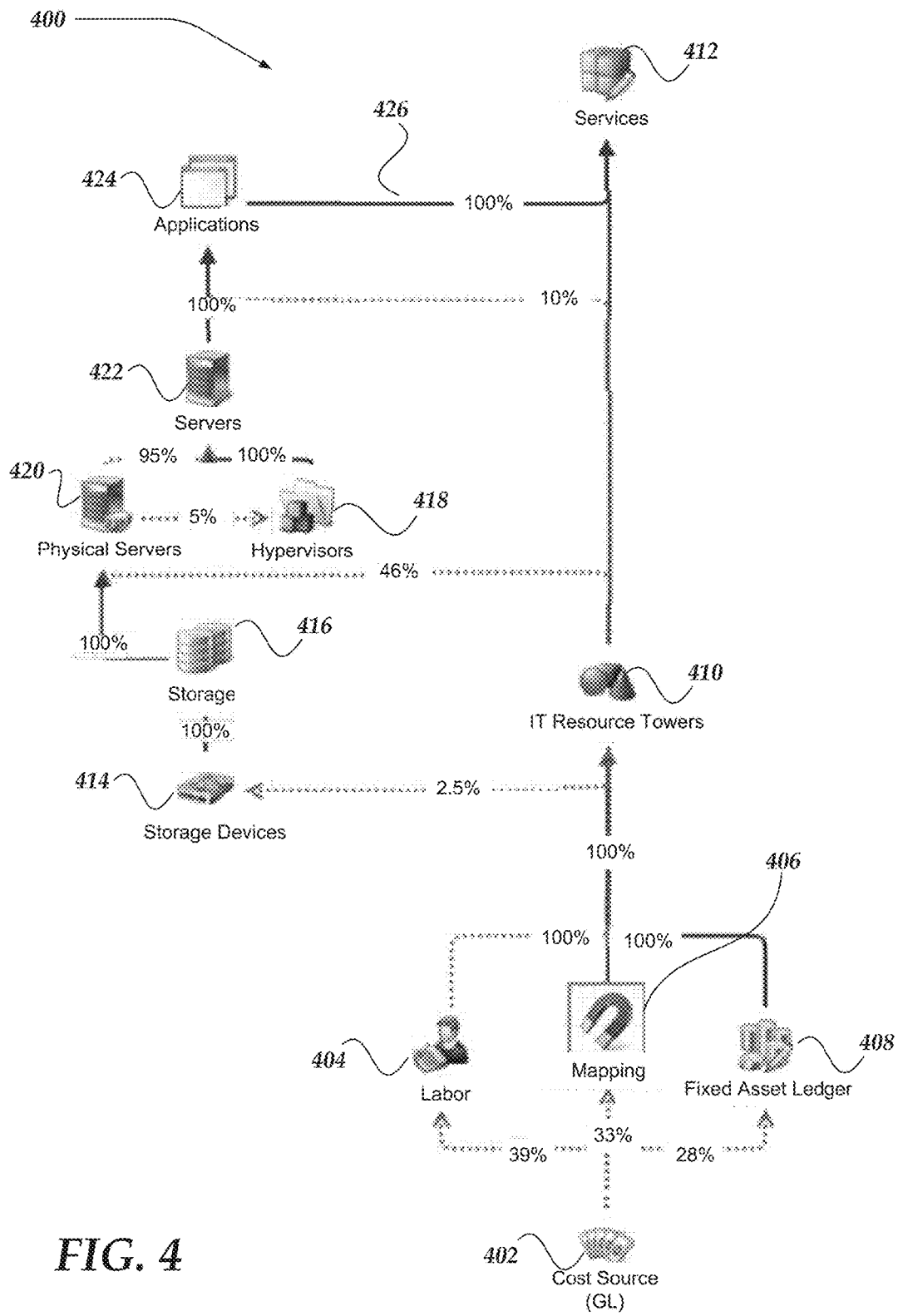
FIG. 4 shows one embodiment of a model for automatically generated business system.

FIG. 4 shows, for at least one of the various embodiments model 400 that may be generated using cost modeling platform server computer 107. In at least one of the various embodiments, in this example, model 400 represents a business system and starts with costs flowing from cost source 402, which may be a general ledger (GL) or other type of financial data. In this model, cost source 402 flows to labor 404, fixed asset 408, and to category mapping 406.

In at least one of the various embodiments, in model 400, labor 404 may be allocated 39% of costs, fixed assets 28% of costs, and the remaining 33% may be allocated to a mapping component In at least one of the various embodiments, based on a selected category template, the costs allocated to mapping component 406 may be allocated to the various cost categories that may make up the business system being modeled.

In at least one of the various embodiments, model 400 shows that 100% of costs flow to IT resource tower 410. From IT resource tower 410 costs flow to services 412. Thus, for this business system, model 400 shows that all the costs are allocated to producing the service offerings that the modeled business organization provides.

In at least one of the various embodiments, the cost modeling application may further enable users to gain additional understanding of how the costs from cost source 402 flow through the entire system. Model 400 shows that storage device 414 is responsible for 2.5% for the costs coming from cost source 402. And, that 100% of the costs of storage device 414 flows into the general category of for storage, shown by the allocation trace that shows of 100% of flowing from the storage device 414 to storage component 416. Likewise, model 400 shows that physical servers 420 are burdened by 100% of the costs of storage 416. And, since the business organization modeled by model 400 includes hypervisors that run on physical servers, the costs associate with hypervisor 418 flow from physical server 420. In at least one of the various embodiments, cost for the server category, servers 422 is constituted out of physical servers 420 and hypervisors 418, thus the costs for server 422 flow from those components. Further the applications 424 component of the model may be burdened with 100% of the costs associated with servers 422. Completing the loop, allocation rule 426 shows that service component 412 may be burdened with 100% of the costs associate with applications 424.

Figure 5:
FIG. 5 illustrates a table that may include dataset information.

FIG. 5 shows table 500 that may include information related to datasets that may be used by cost modeling platform server computer 107 for generating business systems and data models. In at least one of the various embodiments, table 500 shows an example of source cost data in the form of a dataset of General Ledger (GL) accounting records that may be provided by at least one external data source. In at least one of the various embodiments, a dataset may have more or less columns and detail as shown in table 500. In at least one of the various embodiments, dataset information such as shown in table 500 may be provided in various well-known formats and structures. For example, table 500 may be provided as one or more, XML files, comma separated files, directly from database tables, or the like. Also, in at least one of the various embodiments, datasets may be provided in non-standard formats (e.g., proprietary) where custom scripts and applications may be employed to extract and/or parse values from the datasets.

In at least one of the various embodiments, other types of raw datasets may be provided by other external data sources to budget and forecasting platform 107. For example, datasets that include information about physical IT assets, fixed assets, software licenses, employees, labor costs, insurance records, vendor costs, utility costs (electricity, water, sewer, broadband, natural gas, oil, or the like), consulting expenses, legal fees, or the like.

Figure 6:
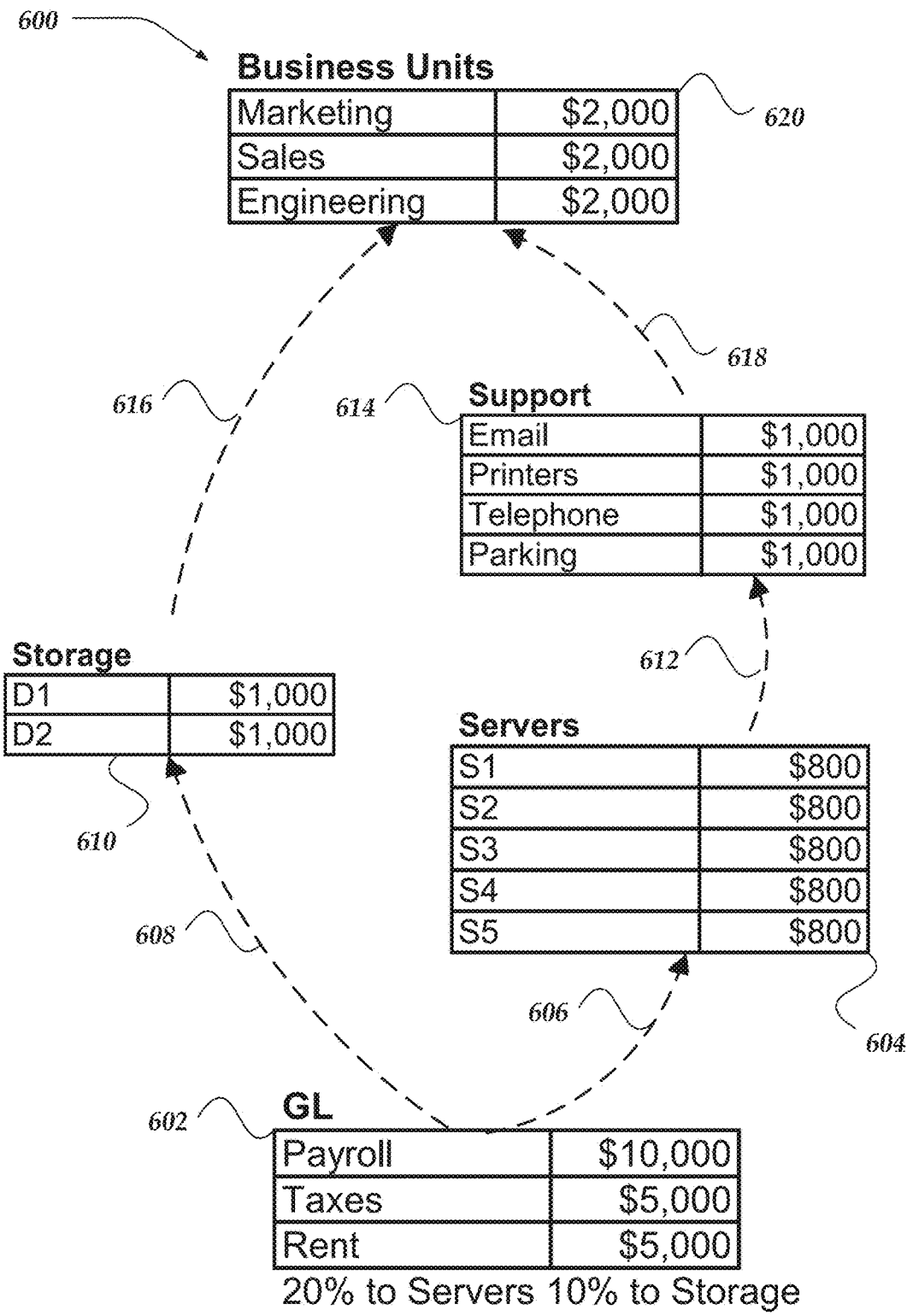
FIG. 6 shows a logical architecture of a model for an automatically generated business system.

FIG. 6 illustrates a portion of a logical architecture for model 600 that may be enabled by at least one of the various embodiments. In at least one of the various embodiments, the model 600 may have five categories/objects: GL 602, Servers 604, Storage 610, Support 612, and Business Units 616. In at least one of the various embodiments, each category contains a set of cost line items. For example, GL 602 includes cost line items for Payroll, Taxes and Rent. Likewise, Support 612 includes cost line items Email, Printers, Telephone, and Parking. In at least one of the various embodiments, each cost line item has one or more associated cost values. For example, Storage 610 has two cost line items, D1, and D2 (e.g., disk drives) having associated cost values of $1000 each.

Allocation rules may be used to connect categories and/or objects of model 600. In at least one of the various embodiments, allocation rules may show how costs (money) flow between the categories. Resulting in a graph where the categories may be represented as nodes and the allocation rules may be represented as edges. In at least one of the various embodiments, generally a model may be represented by a directed acyclic graph but that is not a requirement for an operative model. In at least one of the various embodiments, a model graph may contain cycles that are resolved or estimated using mathematical techniques, including but not limited to Gaussian elimination, Cholesky decomposition or Newton's method.

In at least one of the various embodiments, allocation rule 606 represents a rule allocating 20% of the money in category GL 602 (source object) to Servers category 604 (target object). In this example, GL 602 includes a total of $20,000, thus 20% of $20,000 (e.g., $4,000) flows based on allocation rule 606 to Servers 604. Likewise, allocation rule 608 may allocate $2,000 from GL 602 to Storage 610. The other allocation rules in model 600 allocate 100% of the money to the next category: allocation rule 612 directs 100% of the money (e.g., $4,000) to flow to Support 614; allocation rule 618 directs 100% of the money in Support (e.g., $4,000) to flow to Business Units 620; and allocation rule 616 directs 100% of the money from Storage 610 to flow to Business Units 620.

In at least one of the various embodiments, money that flows into the category (object) may be allocated among the included cost line items. In at least one of the various embodiments, each category may have one or more rules that may describe the assignment ratios for how the money allocated to a category/object may be assigned to its cost line items. For the categories 604, 610, 614, and 620, allocation rules assign the money allocated to the category evenly among the cost line items comprising each category.

In at least one of the various embodiments, an assignment ratio may represent how the money in an actual budget may be assigned from source category/object cost line items to target category/object cost line items. In at least one of the various embodiments, allocation rules may be applied that distribute the money based on formulas that may be defined by the users or administrators who designed the model. In at least one of the various embodiments, the assignment ratios and allocations may be modified as part of the modeling process.

The model 600 is a simplified model useful for facilitating discussion and understanding of the embodiments, since allocation rules for models of large commercial entities can be numerous and complex. However, model 600 is at least sufficient to enable one of ordinary skill in the art to practice what is claimed herein.

Figure 7:
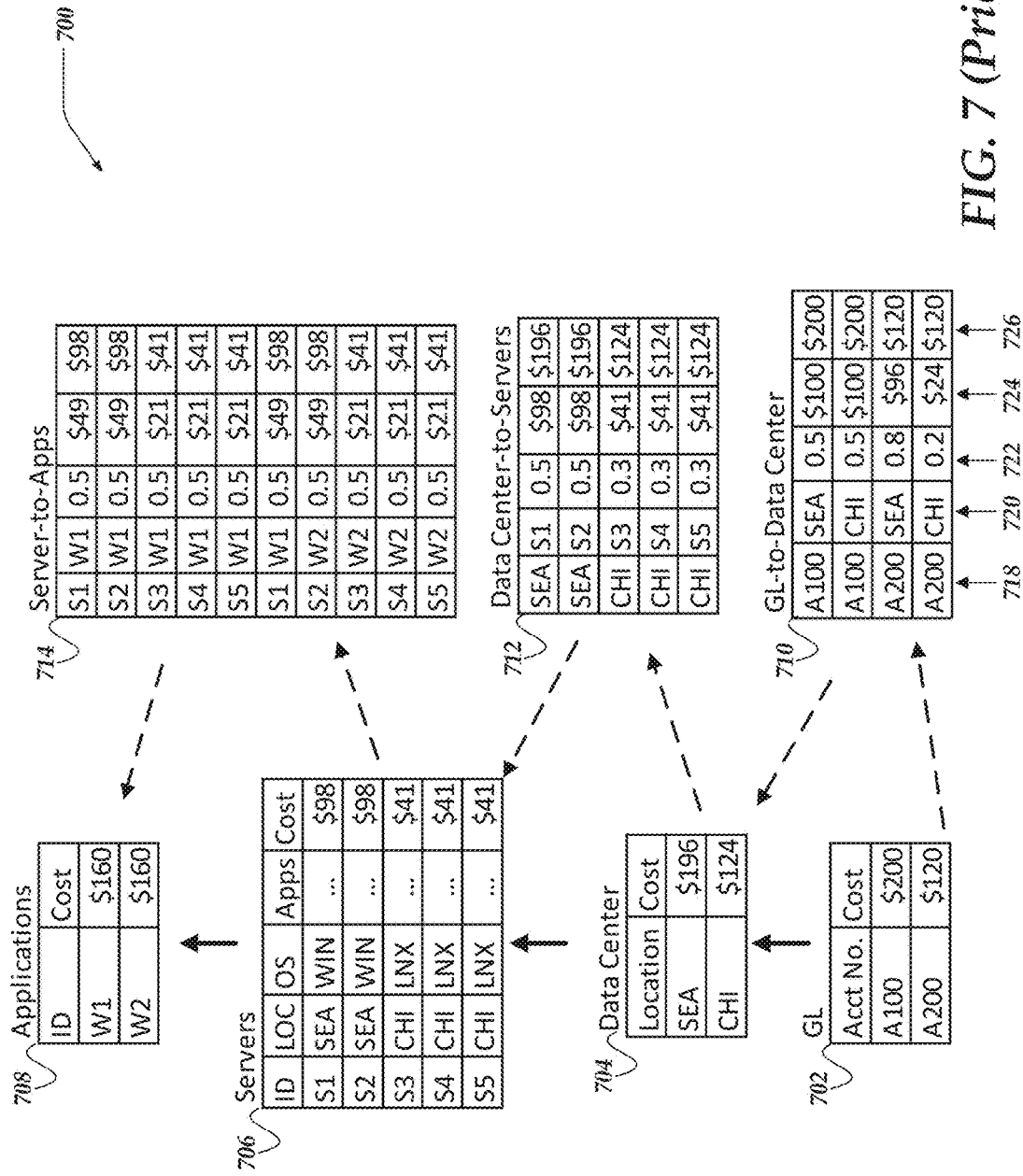
FIG. 7 illustrates a portion of a logical architecture for a data model that illustrates how resources may be allocated in a data model using the prior art.

FIG. 7 illustrates a portion of a logical architecture for data model 700 that illustrates how resources may be allocated in a data model using the prior art. Data model 700 is an example of a data model that is similar to those described previously. Likewise, data model 700 is a simplified example that it used to describe the concepts of the innovations included herein. One of ordinary skill in the art will appreciate that in practice data models may be include hundreds or thousands of model objects each having up millions of model items. For example, data model 700 includes a GL (general ledger) object, GL object 702. In this example, GL object 702 is shown as having two accounts, account A100 and account A200. It will be well-known that in production environments there may be many more accounts in a business's General Ledger. Likewise, servers object 706 is shown as having five servers. However, in production environments, a servers object may represent thousands of servers. Furthermore, model objects used in production environments may have more and/or different columns depending on the configuration of the data model and the dataset used to generate the data model. Nevertheless, while data model 700 is a simplified representation of a data model it is sufficient to enable of one ordinary skill in the art to understand and practice the innovations included herein.

In this example, data model 700 may be arranged to include GL object 702, data center object 704, servers object 706, and applications object 708. The objects in the data model represent how money from GL object 702 may be distributed through business system. Further, assignment ratio tables, such as, assignment ratio table 710, 712, and 714 may be defined to control of how money may be distributed from one model object to another, Assignment ratio tables may be arranged to include allocation rules describing how resources flow from one model object in a data model to another.

In this example, data model 700 includes an assignment ratio table (assignment ratio table 710) to allocate money from GL object 702 to data center object 704. Also, in this example, data model 700 includes an assignment ratio table (assignment ratio table 712) to allocate money from data center object 704 to servers object 706. And, in this example, data model 700 includes an assignment ratio table (assignment ratio table 714) to allocate money from servers object 706 to applications object 706.

In at least one of the various embodiments, the details of how costs may be allocated from one object in the model to another may be encapsulated in one or more allocation rules. In at least one of the various embodiments, allocation rules may generate one or more assignment ratio tables that describe how cost values flow between the modeled objects. For data model 700, allocation rules may be described and illustrated in the form of assignment ratio tables 710, 712, and 714. In some embodiments, the allocation rules may define how an assignment ratio table may be arranged.

In at least one of the various embodiments, an assignment ratio table may be arranged to include one or more columns of information, such as, source object line item 718, target object line item 720, assignment ratio 722, allocation value 724, source value 726, or the like. In this example, the entries in the source object line item column 718 correspond to the line items in GL object 702. Namely, A100 and A200 (e.g., representing account names from a chart-of-accounts). Also, the entries in target object line item column 720 correspond to the line items comprising data center object 704 (e.g., SEA for Seattle and CHI for Chicago). The next column, assignment ratio column 722, contains a value for computing how much money flows from the source object line item to the target object line item. In this example, an allocation rule corresponding to assignment ratio table 710 causes the money from A100 to be evenly divided between location SEA and location CHI. Likewise, 80% (0.8) of the money from A200 is allocated to location SEA and 20% (0.2) is allocated to location CHI. Column 724 in assignment ratio table 710 shows the amount of money that flows from the source object line item to the target item. And column 726 shows the amount of money that the source object line item starts with. For example, based on GL object 702, A100 starts with $200 and A200 starts with $120. Thus, since the assignment ratio for A200 is 80% to location SEA, the line item for SEA is allocated $96 (approximately 80% of $120) while location CHI is allocated $24 (approximately 20% or $120). Likewise, since, in this example, A100 is evenly split with allocation ratio 50% or 0.5 between location SEA and location CHI, each location is allocated $100. In at least one of the various embodiments, the values in data center object 704 reflect the application of the allocation rules corresponding to assignment ratio table 710. Similarly, the remaining objects in model 700 may be allocated costs based on their respective allocation rules and corresponding assignment ratio tables.

In at least one of the various embodiments, the underlying reason for employing a particular allocation rule may depend on the objects that are being modeled. For example, in model 700, account A100 is modeled as a line item in GL object 702 and it may represent the costs/money allocated to operating a Seattle based data center. And A200, also modeled as a line item in GL object 702, may represent the costs/money allocated to operating a Chicago based data center.

Likewise, in this example, referring to assignment ratio table 712, money is allocated from to the servers items. In this example, money allocated to the Seattle data center (SEA in data center object 704) is split between two servers, S1 and S2, while money allocated to the Chicago (CHI) data center is split between three servers (e.g., S3, S4, S5).

Finally, data model 700 models how money is allocated from servers object 706 to applications represented by application object 708. In this case, assignment ratio table 714 shows that the costs allocated to each server are evenly allocated to application W1 and application W2. For examples, the first line of assignment ratio table 714 shows that half of the costs of server S1 ($49) are allocated to application W1 with the other half of the costs of server S1 ($49) are allocated to application W2. Similarly, the costs associated with the other servers (S2-S5) are split between application W1 and W2.

Accordingly, in at least one of the various embodiments, data models, such as, data model 700 enable reports to be generated that answer various questions about how resources are allocated throughout the modeled business system. For example, data model 700 shows that the $320 that entered the system through GL object 702 is split evenly between applications W1 and W2.

Likewise, data model 700 easily answers questions, such as, how much money is allocated to each server located in Seattle? The answer of $98 for each server is readily derived from servers object 706. Generally, models such as data model may enable detailed reporting on how money (or other resources) flow between object that are adjacent in the data models. Reports such as tracing the costs from one object to another may be efficiently generated as long as there are no intervening objects in the model.

For example, using data model 700 it may be easy to report how resources are allocated between GL object 702 and data center object 704 since there are no intervening model objects in the data model. However, to generate report information that include traces costs through one or more intervening model objects may require significant computing resources.

An example of such a report based on data model 700 may be a report of how much of the money from a particular data center contributes to the money allocated to an application. In data model 700 to report on how much of the $160 allocated to application W1 (in application object 708) comes from the $196 allocated to Seattle (in data center object 704) requires a merging of the assignment ratio table 714 and assignment ratio table 712. For a trivial example such as data model 700 the merging is trivial since the size of the assignment ratio tables is small. However, in a production environment an assignment ratio table for servers may have tens of thousands of row. Likewise, an assignment ratio table for applications may have millions of rows. For example, a business system model that included 50,000 servers and 100 applications would require an assignment ratio table having 5,000,000 rows (the product of 50,000 and 100) to model the allocation of money from the servers to the applications. In contrast, the trivial example data model 700 has 2 applications and 5 server so assignment ratio table 714 only requires 10 rows (the product of 5 and 2). Vertically merging assignment ratio table 714 and assignment ratio table 716 for data model 700 would result in a combined table having 50 rows. In a production data model, such as, described above, merging an assignment ratio table having 5 million rows with one having 50,000 rows would results in a significantly larger assignment ratio table that would impact performance of the system.

One of ordinary skill in the art will appreciate that model objects and tables such as those described above may be arranged to have more or fewer features, columns, rows, or the like. Likewise, data models may be arranged in different geometries and have more (many more) or fewer model objects depending on the application and/or the business system being modeled. Also, data models may arranged to model the allocation of different resources, such as, financial resources (money), energy, water, power, or the like.

Figure 8:
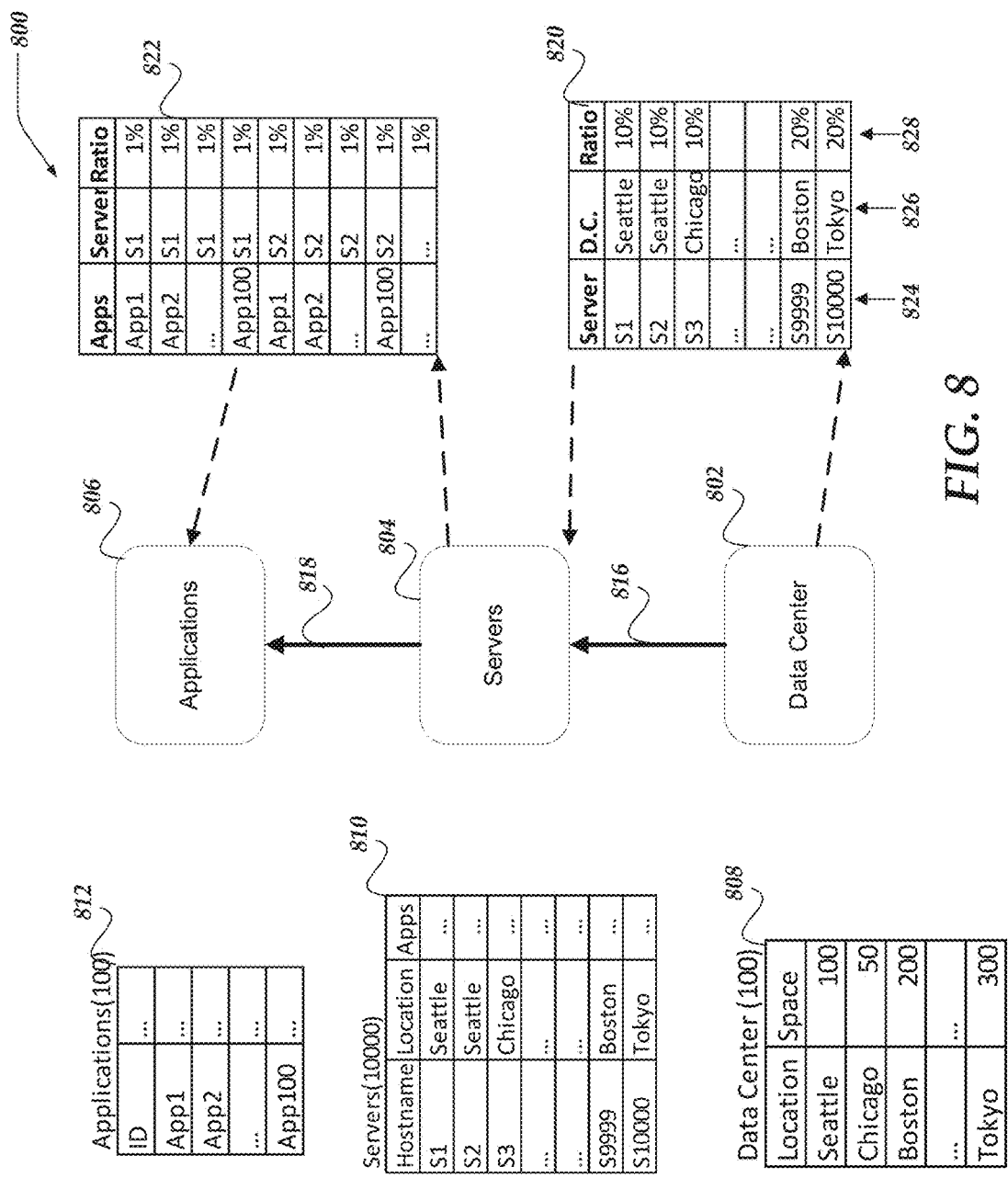
FIG. 8 illustrates a portion of a data model that may be used for model the allocation of resources in accordance with at least one of the various embodiments.

FIG. 8 illustrates a portion of data model 800 that may be used for model the allocation of resources in accordance with at least one of the various embodiments. Data model is similar to data model 700 except it is illustrated to represent a much larger system. Accordingly, in at least one of the various embodiments, data model 800 comprises three data objects, data center object 802, server object 804, and applications object 806. In at least one of the various embodiments, each data object is backed by a corresponding line item table that include records for each instance of a data object that is being modeled. In this example, line items 808 contains a list of 100 data centers that are represented by data center object 802. Likewise, in this example, servers line items 810 includes records for 10000 separate servers. And, applications line items 812, includes the 100 different applications that may be being modeled in data model.

As described above, in at least one of the various embodiments, resources may be allocated between data objects using allocation rules. In FIG. 800, allocation rules are represented by arrows. In this case, arrow 816 represents the allocation of resources from the data center object to the servers. And, arrow 818 represents the allocation of resource from the servers object to the application object. Allocation rules may be arranged to define how resources are allocated between the line items (cost line items) of one data object to the cost line item of another data object. For example, allocation rule 816 may be arranged to allocate resources from data centers to servers based on amount space a server may be consuming in a data center where the server is located. In other cases, the allocation rule may evenly distribute the resources. In practice, there may be an arbitrary amount different consideration that may be used for designing allocation rules.

In at least one of the various embodiments, in this example, since data centers 802 and servers 804 are related by location, an allocation rule may be arranged to allocate resources based on the location of the servers. In such cases, the allocation rule may be arranged to allocate resources from data centers to servers based on their common location.

In at least one of the various embodiments, as described in FIG. 7, the application of allocation rules to allocate resources may produce assignment ratio tables that include records showing how resources are mapped/allocated to the line items of the data objects. Assignment ratio tables may be generated by applying allocation rules to the cost line items that are associated with a data object.

In this example, allocation rule 816 may be arranged to generate assignment ratio table 820. In this example, assignment ratio (AR) table 820 omits showing all of the columns shown in for other AR table (total cost, cost) though other embodiments may include them and other columns without departing from the scope of these innovation. AR table 820 is illustrated using this reduced format for brevity and clarity. Typical of other AR tables described herein, AR table 820 includes column 824 which holds the id/hostname of the servers, column 826 which holds the name/id of the data center (its location here doubles as its name), and column 828 that shows the assignment ratio for each line item. In this example, AR table 820 shows that 10% of the money from the Seattle data center is allocated to server S1. Likewise, AR table 820 shows that 20% of the money from the Tokyo data center is allocated to server S10000. In this example, using a simple allocation rule that allocates costs based on location, AR table 820 would include at least 10000 rows.

Also in this example, allocation rule 818 may be an allocation rule that allocates the costs of a server evenly to each application. This models the case here where each of the 100 applications represented by application object 806 are running on each server. Accordingly, for this case, the application of the allocation rule 818 may generate AR table 822. In this case, AR table 822 will have 1,000,000 rows, since each of the 100 applications is used by each of the 10,000 server line items—accordingly they contribute to the cost of each server.

In at least one of the various embodiments, data model 800 may be used for generating report information in response to queries, such as, how much of costs of the Seattle data center may be attribute to the server S1. Likewise, using data model 800 it may be elementary to compute how much of the costs of server S1 is attributed to application Appl, and so on. However, in at least one of the various embodiments, to compute how much of the resource/costs of an application come from a particular data center requires another AR table to be generated by vertically merging AR table 822 and AR table 820. In this example, such a merge operation will produce an AR table that has 1,000,000×10,000 rows (1.0×E10) where each row is generated in part by multiplying the assignment ratios of the corresponding applications and servers to compute a value for how much of the cost of an application should be attributed to a particular data center. Also, since the computational expense of such processing increases as the number of line items in a data object increases, data models with larger objects (not uncommon for moderate to large enterprises) increasing become prohibitively expense to work with.

Figure 9:
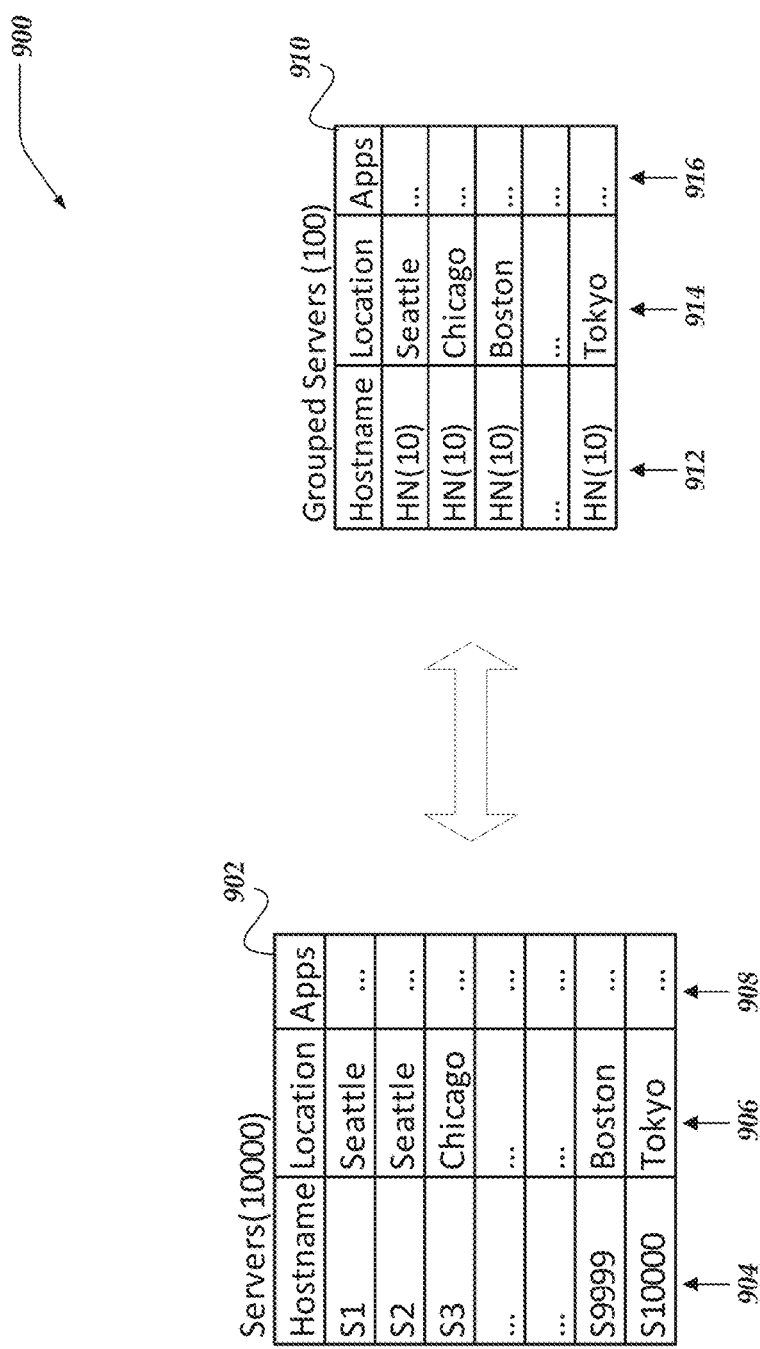
FIG. 9 illustrates a logical representation of a portion of a data model arranged for continuously variable resolution of resource allocation in accordance with at least one of the various embodiments.

FIG. 9 illustrates a logical representation of a portion of data model 900 arranged for continuously variable resolution of resource allocation in accordance with at least one of the various embodiments. As described above, drill down operations to compute the allocation amounts for some data object may become increasingly expensive as the number of line items in the data objects increases. However, in at least one of the various embodiments, the line items in data object may be grouped based on key features of the data object that are identified in the allocation rules. Grouping may significantly reduce the number of calculations required to generate report information that describes how some resources are allocated.

In this example, for at least one of the various embodiments, line item table 902 represents the cost line items for a server object. Each server that may be being modeled may have a line item in the table. For example, line item table 902 represents a data structure that has 10,000 server records, one for each computer server in the modeled entity. Also, in this example, line item table 902 is arranged to store the hostname of each server in column 904; the location of each server is column 906; and a list of applications used by each server. One of ordinary skill in the art will appreciate that the line item tables may be arranged include an arbitrary number of columns depending on the information that may be available for modeling. For example, in some embodiments, a server line item table may include columns, for operating system, licensing, CPU type, number of CPU, amount of RAM, model number, or the like, or combination thereof. However, in this example for brevity and clarity line item table 902 is represented as having the three columns shown herein.

In at least one of the various embodiments, allocation rules may be analyzed to identify the values that are relevant for allocating resources. For example, allocation rule 816 as described in FIG. 8, allocates money based on the location of the server. Accordingly, in this example, the location of a server controls how resources are allocated to it. In contrast, other server features, such as, hostname, application, operating system, CPU model, are irrelevant to allocation rule 816 that allocates resources based on location. These values may be considered key features.

Accordingly, in at least one of the various embodiments, grouped objects may be generated that collapse the line items to the minimum cardinality of rows based on the columns of the data object that are key features—the columns that are relevant to the allocation rules that are being used.

In at least one of the various embodiments, if the allocation rules associated with servers 902 allocate resources based on the location of the server (the key feature), a grouped server object, such as group server object 910 may be generated. In this example grouped server object 910 reduces the number of line items to the number of locations. In this example, (referring to FIG. 8 as well), there are 10,000 servers and 100 data center locations. Accordingly, in this example, using grouped server object 910 reduces the numbers of line items by an order of magnitude.

In at least one of the various embodiments, since grouped objects are arranged to include the pertinent columns for the operation of the allocation rules, the resources allocations made be made using grouped objects rather than the original data objects. This may result in the generation assignment ratio tables that are significantly smaller that if the entire data object is used. For example, assignment ratio table 820 that has 10,000 rows could be replaced by an assignment ratio table that has 100 rows.

In this example, grouped server object 910 may include three columns: column 912 that may include the hostnames (IDs) of the servers that are associated with a given location; column 914 that may hold the location value that is used for executing allocation rule 816; and column 910 that includes or references the applications for each server. Note, since column 912 and column 916 are multi-valued, they may include copies or references to other lists or tables, that include the multiple values. In at least one of the various embodiments, original data object may remain linked to the grouped object. Accordingly, the data object may be referenced if additional detail is needed.

Generalized Operations

Figure 10:
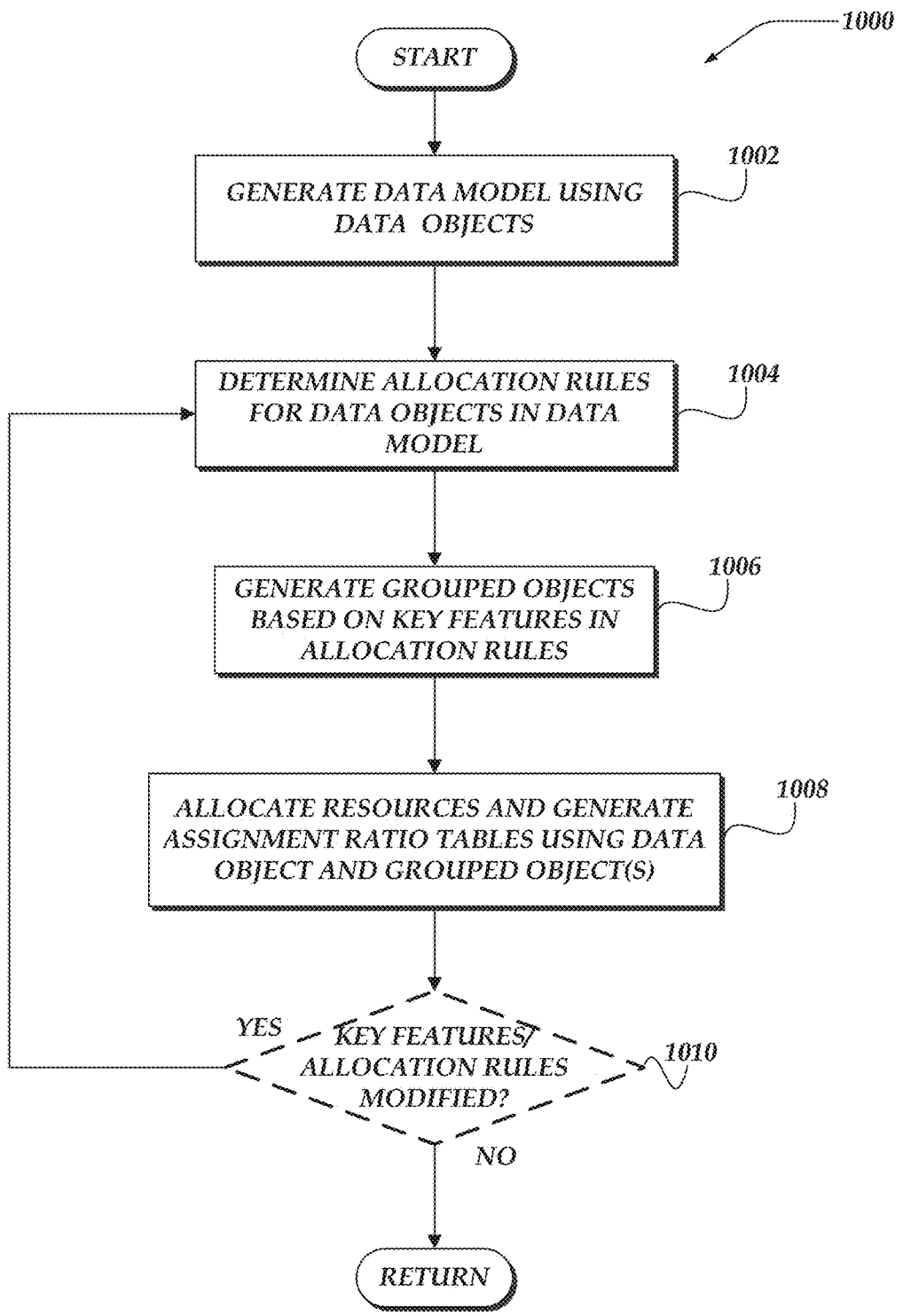
FIG. 10 illustrates a flowchart for a process for continuously variable resolution of resource allocation in accordance with at least one of the various embodiments.
Figure 11:
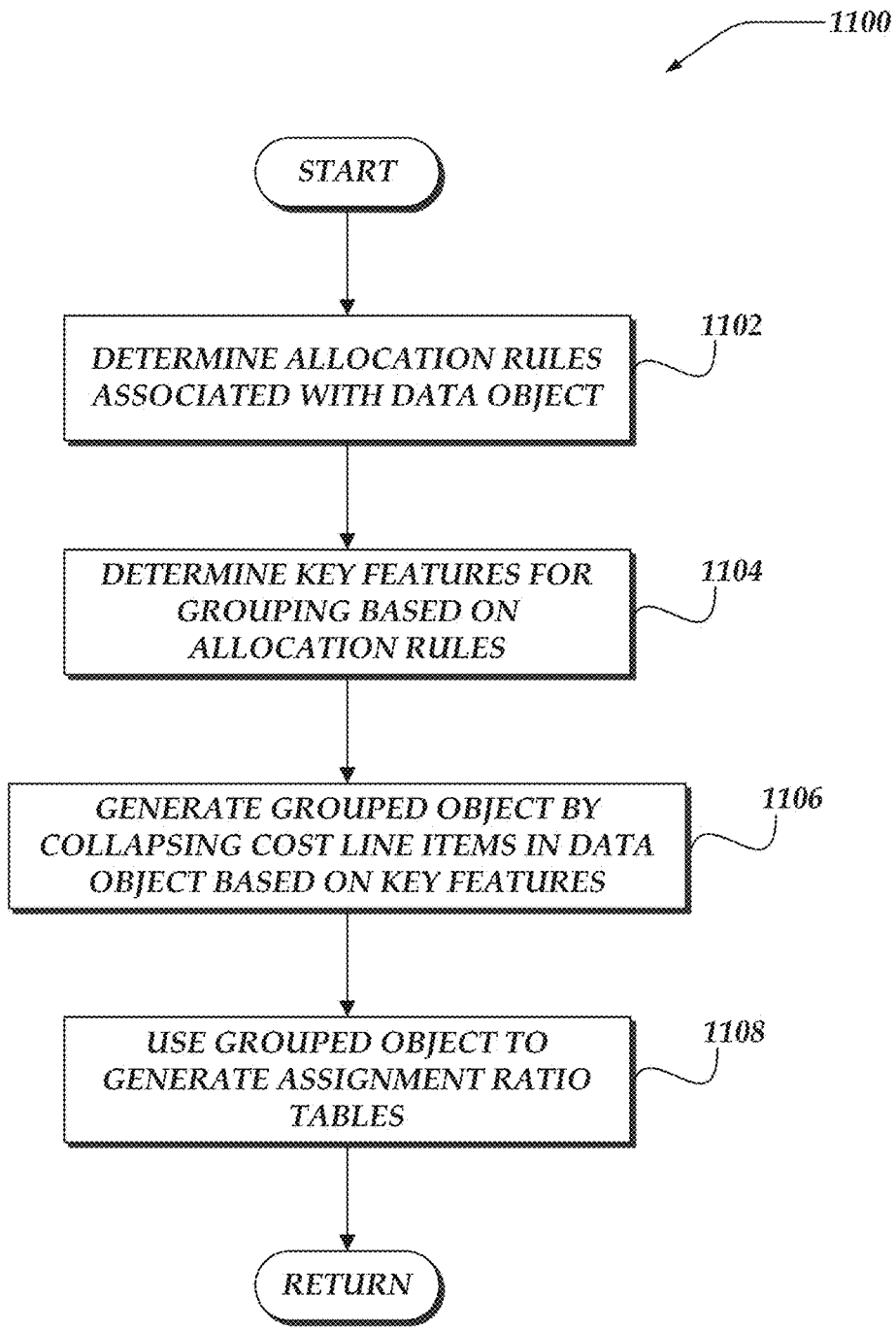
FIG. 11 illustrates a flowchart for a process for determining allocation rules for generating grouped object in accordance with at least one of the various embodiments.
Figure 12:
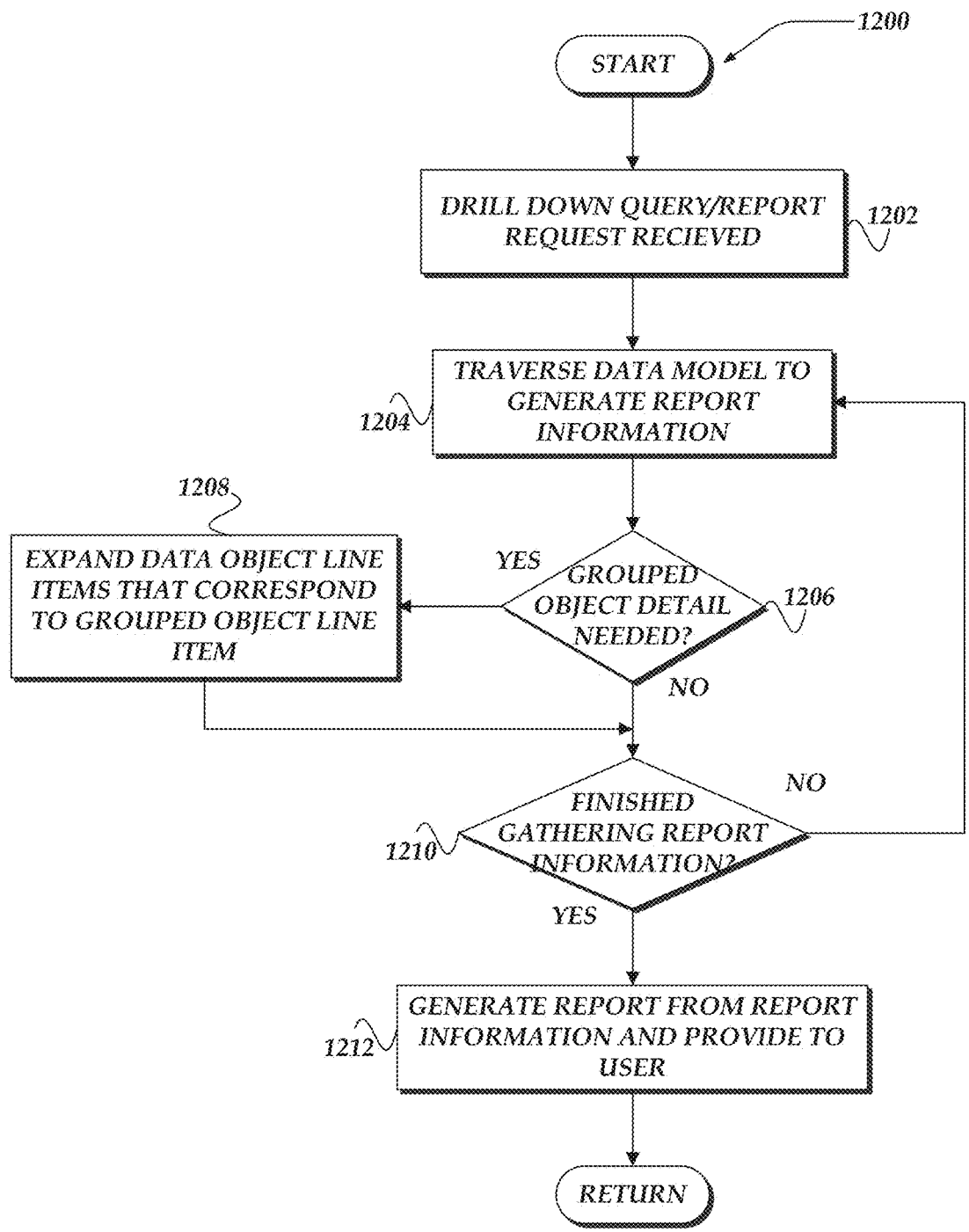
FIG. 12 illustrates a flowchart for a process for determining generating reporting information from grouped objects in accordance with at least one of the various embodiments.

FIGS. 10-12 represent the generalized operations for continuously variable resolution of resource allocation in accordance with at least one of the various embodiments. In at least one of the various embodiments, processes 1000, 1100, and 1200 described in conjunction with FIGS. 10-12 may be implemented by and/or executed on a single network computer, such as network computer 300 of FIG. 3. In other embodiments, these processes or portions thereof may be implemented by and/or executed on a plurality of network computers, such as network computer 300 of FIG. 3. However, embodiments are not so limited, and various combinations of network computers, client computers, virtual machines, or the like may be utilized. Further, in at least one of the various embodiments, the processes described in conjunction with FIGS. 10-12 may be operative in cost modeling architectures such as those described in conjunction with FIGS. 4-9. Moreover, some or all of processes 1000, 1100, and 1200 may be performed by one or more applications, such as, cost modeling application 322 shown in FIG. 3.

FIG. 10 illustrates a flowchart for process 1000 for continuously variable resolution of resource allocation in accordance with at least one of the various embodiments. After a start block, at block 1002, in at least one of the various embodiments, a data model may be generated using a plurality of data objects. Such as described above. In at least one of the various embodiments, the data model may include various data objects the modeled parts and/or categories of a business entity. Also, the data model may include one or more allocation rules that define how resources may be allocated through the data model.

At block 1004, in at least one of the various embodiments, process 1000 may determine some or all of the allocation rules that may be included in the data model. In at least one of the various embodiments, process 1000 may be arranged to automatically identify the allocation rules in the model for further processing. In at least one of the various embodiments, a user may be enabled to select one or more allocation rules and/or data object for further processing. As described above, the data model may be arranged to model how resources may be allocated within a business system. For example, the data model may be used to model how money flows through a business. The model may be arranged to be representative of how the resources are currently allocated with the business system or it may be designed for planning and/or forecasting of the use of resources. (e.g., budgeting).

At block 1006, in at least one of the various embodiments, one or more grouped objects may be generated based on the determined allocation rules. In at least one of the various embodiments, the determined allocation rules may be parsed to determine the key features for the data objects in the data model that drive the allocations. For example, allocation rule 816 allocates resources based on the location of the servers/data centers. Accordingly, in this example, location is a key feature.

At block 1008, in at least one of the various embodiments, resource may be allocated within the data model using the data objects, grouped object, and the allocation rules. Also, in at least one of the various embodiments, for each allocation rule that is applied an assignment ratio table may be generated.

At decision block 1010, in at least one of the various embodiments, optionally, if the key features and/or the allocation rules are modified, control may loop back to block 1004; otherwise, control may be returned to a calling process. In at least one of the various embodiments, updates made to allocation rules may change the key features for data objects in that model. Accordingly, the grouped objects and their associated assignment ratio tables may be update reflect the addition of key features or the removal of key features. Likewise, changes to the values of key features may occur that required the grouped object to be regenerated or otherwise updated. For example, if new line items are added to a data object, its corresponding grouped object (if any) may need to be updated based the key feature value changes. Next, control may be returned to a calling process.

FIG. 11 illustrates a flowchart for process 1100 for determining allocation rules for generating grouped object in accordance with at least one of the various embodiments. After a start block, at block 1102, in at least one of the various embodiments, one or more allocation rules may be determined for a given data object. In at least one of the various embodiments, data objects in a data model may be associated with one or more allocation rules. Accordingly, the data model may be traversed to determined and/or identify the allocation rules for a data object. For example, a data object may have an allocation rule that defines resources being allocated to the data object and/or there may be an allocation rule that defines how resources are allocated from the data object.

At block 1104, in at least one of the various embodiments, the determined allocation rules may be analyzed to determine the data object features, if any that are relevant to the operation of the allocation rules. For example, as described above, for allocation rule 816, the controlling feature of the allocation rule is the location of servers and the data centers. Other allocation rules in other data model may have different features, such as, model of the server, server roles, (e.g., web server, database server, or the like) CPU type, or the like, or combination thereof.

In at least one of the various embodiments, an allocation rule may be arranged to have more than one key feature, such as, location and server role. Likewise, in at least one of the various embodiments, some allocation rules may be arranged to essential having no grouping feature, such as, rules that just split/share the resources evenly.

At block 1106, in at least one of the various embodiments, a grouped object may be generated by grouping/collapsing the cost line items in the data object based on the grouping features that were determined for its associated allocation rules.

In at least one of the various embodiments, a grouped object may be collapsed to the minimum number of rows that maintain the distinct values of the key features determined from its associated allocation rules. For example, in allocation rule 816 the key feature is location, thus the grouped object (e.g., grouped object 910) may be reduced to the number of distinct locations.

At block 1108, in at least one of the various embodiments, the grouped object may be employed to generate one or more assignment ratio tables based on its associated allocation rules. In at least one of the various embodiments, the allocation rules may be applied to the grouped object and one or more data objects. The grouped objects are arranged such that they include a reduced set of line items (less than their corresponding data object). Accordingly, assignment ratio tables that are generated during the application of the allocation rules may have significantly less rows to be computed.

Next, control may be returned to a calling process.

FIG. 12 illustrates a flowchart for process 1200 for determining generating reporting information from grouped objects in accordance with at least one of the various embodiments. After a start block, at block 1202, in at least one of the various embodiments, a drill down query and/or report request may be provided to an application, such as, cost modeling application 322. In at least one of the various embodiments, the query/request may be generated by a user or external system. In some embodiments, the query/request may be provided by way of a graphical user interface. In at least one of the various embodiments, the query/request may be provided using an API.

At block 1204, in at least one of the various embodiments, the cost modeling application may traverse the data model in response the query/request. In at least one of the various embodiments, the query may comprise a question about how many resources at one data object are allocated to/from another object. For example, referring to FIG. 7, a query may be provided that asks: "How much of the money allocated to Application W1 comes from GL account A200?" Accordingly to answer such questions/queries, the cost modeling application may traverse the model and compute the share of GL account A100 money that is allocated to Application W1. Likewise, for example, referring to FIG. 8, a query may ask: "how much of the model allocated to Appl is sourced from the data center in Seattle.

At decision block 1206, in at least one of the various embodiments, if grouped object detail is needed, control may flow to block 1208; otherwise, control flow to decision block 1210. In at least one of the various embodiments, when a data model includes grouped objects, the assignment ratio tables used to answer the queries are generated using the grouped objects to reduce computation cost. However, in some cases, the query may be arranged such that it requires one or more grouped line items (collapsed rows) in the grouped object to be expanded to completely answer the query and/or produce the requested report information. For example, the query may include a filter clause that references one or more values of a data objects features that where not used in the allocation rules. Accordingly, such features, would not be directly represented/included in the assignment ration table that may be associated with the grouped object. Referring to FIG. 9, in this example, grouped object 910 is collapsed down to the distinct location values. Accordingly, if the query includes include a filter referring to particular hostnames or applications (Apps) the pertinent information may be pulled from the corresponding data object. (e.g., server object 902). Likewise, additional details of a line item in a data object may be collected and used even though the grouped object (having the collapsed rows) is used for computing the results and/or generating the requested report information.

At decision block 1210, in at least one of the various embodiments, if the cost modeling application has completed generating the report information for answering the query/request, control may flow to block 1212; otherwise, control may loop back to block 1204. In at least one of the various embodiments, there may be multiple data object and/or grouped object that contribute to the report information that may be used to answer a query/report request. Accordingly, the cost modeling application will continue iterating of data object, grouped objects and their associated assignment ratio tables until the information gathering is finished.

At block 1212, in at least one of the various embodiments, a report may be generated based on the report information that may have been gathered. In at least one of the various embodiments, reports may be provided in various formats, such as, displayed using a graphical user interface, saved to a databases, printed, communicated to an external application or process for further processing, or the like, or combination thereof. Next, control may be returned to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. These program instructions may be stored on some type of machine readable storage media, such as processor readable non-transitive storage media, or the like. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions. The foregoing example should not be construed as limiting and/or exhaustive, but rather, an illustrative use case to show an implementation of at least one of the various embodiments of the invention.

Additionally, in one or more steps or blocks, may be implemented using embedded logic hardware, such as, an Application Specific Integrated Circuit (ASIC), Field Programmable Gate Array (FPGA), Programmable Array Logic (PAL), or the like, or combination thereof, instead of a computer program. The embedded logic hardware may directly execute embedded logic to perform actions some or all of the actions in the one or more steps or blocks. Also, in one or more embodiments (not shown in the figures), some or all of the actions of one or more of the steps or blocks may be performed by a hardware microcontroller instead of a CPU. In at least one embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

What is claimed as new and desired to be protected by Letters Patents of the United States is:

1. A method for allocating resources in a business system using a network computer that includes one or more processors that perform actions, comprising:
   providing, by the one or more processors, a data model comprised of nodes and edges that includes a plurality of data objects that is stored in a non-transitory computer readable memory that is configured and arranged to store the data model of the network computer, wherein each data object includes a plurality of data object line items;
   employing, by the one or more processors, geolocation information provided, by one or more global positioning systems (GPS) devices, to select features of the plurality of data objects and data object line items based on a physical location of a user's client computer, wherein the selected features include one or more of time zones, languages, currencies, or calendar formatting, and wherein the features are used by one or more of user-interfaces, internal processes, or databases;
   providing, by the one or more processors, a plurality of allocation rules that allocate the resources between the two or more of the plurality of data objects;
   employing, by the one or more processors, the plurality of allocation rules to identify one or more key features of one or more data objects of the plurality of data objects, wherein the one or more key features are used by the allocation rules to allocate the resources;
   when the actions of the one or more processors identify the one or more key features performing further actions, including:
      retrieving, by the one or more processors, the stored data model from the non-transitory computer readable memory;
      modifying, by the one or more processors, the data model by providing one or more grouped objects that separately correspond to one or more source data objects that allocate the resources to one or more target data objects based on an execution of the allocation rules that include one or more of the one or more key features;
      generating, by the one or more processors, one or more grouped object line items for each of the one or more grouped objects based on each distinct value of the one or more key features, wherein one or more source data object line items that include the same one or more key features are grouped together to improve computational efficiency by collapsing rows to a minimum cardinality of rows based on one or more columns of the one or more source data objects that correspond to the one or more key features, which are also pertinent to generating report information regarding operation of the allocation rules, to provide the one or more grouped object line items, wherein a grouped object line item is provided for the each distinct value of the one or more key features, and wherein one or more other features of the one or more source data object line items are included in multi-valued columns of the one or more grouped object line items; and
      modifying, by the one or more processors, the data model by providing one or more assignment ratio tables that include one or more assignment ratio rows based on the allocation rules, wherein the one or more assignment ratio rows in the one or more assignment ratio tables provide allocations using the grouped object line items; wherein the modified data model and the one or more assignment ratio tables are stored in the non-transitory computer readable memory of the network computer, and wherein the one or more selected features improve the user's understanding of the modified data model that is displayed to the user of the client computer when the client computer is located at a particular physical location.

2. The method of claim 1, further comprising:
   when a query is provided, performing further actions, including:
      traversing, by the one or more processors, at least a portion of the plurality of data objects based on the query; and
      when a grouped object is encountered during traversal, providing, by the one or more processors, at least a portion of results for the query using one or more of the grouped object's grouped object line items.

3. The method of claim 1, further comprising, storing, by the one or more processors, one or more values from individual data object line items in a grouped object line item, wherein the one or more values enable a corresponding individual data object line item, from the individual data object lines items, to be resolved from the grouped object line item.

4. The method of claim 1, wherein generating the one or more assignment ratio tables, further includes, employing the one or more grouped object line items to generate one or more of the rows in the assignment ratio tables, wherein the one or more of the rows represent the allocation of resources for one or more data objects.

5. The method of claim 1, further comprising, when a query references one or more features that are absent from a grouped object, accessing, by the one or more processors, the one or more features directly from a data object that is stored in the non-transitory computer readable memory that corresponds to the grouped object.

6. The method of claim 1, further comprising, identifying, by the one or more processors, one or more of the plurality of data objects that are used to provide one or more of the one or more grouped objects.

7. The method of claim 1, further comprising, updating, by the one or more processors, the one or more grouped objects based on modifications that are made to one or more of the plurality of allocation rules, wherein the modifications include one or more of an increase in a number of the one or more key features, or a decrease in the number of the one or more key features.

8. A system for allocating resources in a business system, comprising:
   a network computer, comprising:
      a transceiver that communicates over the network;
      a memory that stores at least instructions; and
      one or more processor devices that execute instructions that perform actions, including:
         providing, by the one or more processors, a data model comprised of nodes and edges that includes a plurality of data objects that is stored in a non-transitory computer readable memory that is configured and arranged to store the data model of the network computer, wherein each data object includes a plurality of data object line items;

employing, by the one or more processors, geolocation information provided, by one or more global positioning systems (GPS) devices, to select features of the plurality of data objects and data object line items based on a physical location of a user's client computer, wherein the selected features include one or more of time zones, languages, currencies, or calendar formatting, and wherein the features are used by one or more of user-interfaces, internal processes, or databases;

providing, by the one or more processors, a plurality of allocation rules that allocate the resources between the two or more of the plurality of data objects;

employing, by the one or more processors, the plurality of allocation rules to identify one or more key features of one or more data objects of the plurality of data objects, wherein the one or more key features are used by the allocation rules to allocate the resources;

when the actions of the one or more processors identify the one or more key features performing further actions, including:
retrieving, by the one or more processors, the stored data model from the non-transitory computer readable memory;
modifying, by the one or more processors, the data model by providing one or more grouped objects that separately correspond to one or more source data objects that allocate the resources to one or more target data objects based on an execution of the allocation rules that include one or more of the one or more key features;
generating, by the one or more processors, one or more grouped object line items for each of the one or more grouped objects based on each distinct value of the one or more key features, wherein one or more source data object line items that include the same one or more key features are grouped together to improve computational efficiency by collapsing rows to a minimum cardinality of rows based on one or more columns of the one or more source data objects that correspond to the one or more key features, which are also pertinent to generating report information regarding operation of the allocation rules, to provide the one or more grouped object line items, wherein a grouped object line item is provided for the each distinct value of the one or more key features, and wherein one or more other features of the one or more source data object line items are included in multi-valued columns of the one or more grouped object line items; and
modifying, by the one or more processors, the data model by providing one or more assignment ratio tables that include one or more assignment ratio rows based on the allocation rules, wherein the one or more assignment ratio rows in the one or more assignment ratio tables provide allocations using the grouped object line items; wherein the modified data model and the one or more assignment ratio tables are stored in the non-transitory computer readable memory of the network computer; and a client computer, comprising:
a client computer transceiver that communicates over the network;
a client computer memory that stores at least instructions; and
one or more processor devices that execute instructions that perform actions, including:
displaying the modified data model, and wherein the one or more selected features improve the user's understanding of the modified data model that is displayed to the user of the client computer when the client computer is located at a particular physical location.

9. The system of claim 8, wherein the one or more network computer processor devices execute instructions that perform actions, further comprising:
when a query is provided, performing further actions, including:
traversing at least a portion of the plurality of data objects based on the query; and
when a grouped object is encountered during traversal, providing at least a portion of results for the query using one or more of the grouped object's grouped object line items.

10. The system of claim 8, wherein the one or more network computer processor devices execute instructions that perform actions, further comprising, storing one or more values from individual data object line items in a grouped object line item, wherein the one or more values enable a corresponding individual data object line item, from the individual data object lines items, to be resolved from the grouped object line item.

11. The system of claim 8, wherein generating the one or more assignment ratio tables, further includes, employing the one or more grouped object line items to generate one or more of the rows in the assignment ratio tables, wherein the one or more of the rows represent the allocation of resources for one or more data objects.

12. The system of claim 8, wherein the one or more network computer processor devices execute instructions that perform actions, further comprising, when a query references one or more features that are absent from a grouped object, accessing the one or more features directly from a data object that is stored in the non-transitory computer readable memory that corresponds to the grouped object.

13. The system of claim 8, wherein the one or more network computer processor devices execute instructions that perform actions, further comprising, identifying one or more of the plurality of data objects that are used to provide one or more of the one or more grouped objects.

14. The system of claim 8, wherein the one or more network computer processor devices execute instructions that perform actions, further comprising, updating the one or more grouped objects based on modifications that are made to one or more of the plurality of allocation rules, wherein the modifications include one or more of an increase in a number of the one or more key features, or a decrease in the number of the one or more key features.

15. A processor readable non-transitory storage memory that includes instructions for allocating resources in a business system, wherein execution of the instructions by one or more hardware processors performs actions, comprising:
providing, by the one or more processors, a data model comprised of nodes and edges that includes a plurality of data objects that is stored in a non-transitory computer readable memory that is configured and arranged to store the data model of the network computer, wherein each data object includes a plurality of data object line items;

employing, by the one or more processors, geolocation information provided, by one or more global positioning systems (GPS) devices, to select features of the plurality of data objects and data object line items based on a physical location of a user's client computer, wherein the selected features include one or more of time zones, languages, currencies, or calendar formatting, and wherein the features are used by one or more of user-interfaces, internal processes, or databases;

providing, by the one or more processors, a plurality of allocation rules that allocate the resources between the two or more of the plurality of data objects;

employing, by the one or more processors, the plurality of allocation rules to identify one or more key features of one or more data objects of the plurality of data objects, wherein the one or more key features are used by the allocation rules to allocate the resources;

when the actions of the one or more processors identify the one or more key features performing further actions, including:

retrieving, by the one or more processors, the stored data model from the non-transitory computer readable memory;

modifying, by the one or more processors, the data model by providing one or more grouped objects that separately correspond to one or more source data objects that allocate the resources to one or more target data objects based on an execution of the allocation rules that include one or more of the one or more key features;

generating, by the one or more processors, one or more grouped object line items for each of the one or more grouped objects based on each distinct value of the one or more key features, wherein one or more source data object line items that include the same one or more key features are grouped together to improve computational efficiency by collapsing rows to a minimum cardinality of rows based on one or more columns of the one or more source data objects that correspond to the one or more key features, which are also pertinent to generating report information regarding operation of the allocation rules, to provide the one or more grouped object line items, wherein a grouped object line item is provided for the each distinct value of the one or more key features, and wherein one or more other features of the one or more source data object line items are included in multi-valued columns of the one or more grouped object line items; and modifying, by the one or more processors, the data model by providing one or more assignment ratio tables that include one or more assignment ratio rows based on the allocation rules, wherein the one or more assignment ratio rows in the one or more assignment ratio tables provide allocations using the grouped object line items; wherein the modified data model and the one or more assignment ratio tables are stored in the non-transitory storage memory, and wherein the one or more selected features improve the user's understanding of the modified data model that is displayed to the user of the client computer when the client computer is located at a particular physical location.

16. The memory of claim 15, further comprising:
when a query is provided, performing further actions, including:
traversing at least a portion of the plurality of data objects based on the query; and
when a grouped object is encountered during traversal, providing at least a portion of results for the query using one or more of the grouped object's grouped object line items.

17. The memory of claim 15, further comprising, storing one or more values from individual data object line items in a grouped object line item, wherein the one or more values enable a corresponding individual data object line item, from the individual data object lines items, to be resolved from the grouped object line item.

18. The memory of claim 15, wherein generating the one or more assignment ratio tables, further includes, employing the one or more grouped object line items to generate one or more of the rows in the assignment ratio tables, wherein the one or more of the rows represent the allocation of resources for one or more data objects.

19. The memory of claim 15, further comprising:
when a query references one or more features that are absent from a grouped object, accessing the one or more features directly from a data object that is stored in the non-transitory computer readable memory that corresponds to the grouped object.

20. The memory of claim 15, further comprising, identifying one or more of the plurality of data objects that are used to provide one or more of the one or more grouped objects.

21. The memory of claim 15, further comprising, updating the one or more grouped objects based on modifications that are made to one or more of the plurality of allocation rules, wherein the modifications include one or more of an increase in a number of the one or more key features, or a decrease in the number of the one or more key features.

22. A network computer for allocating resources in a business system, comprising:
a transceiver that communicates over the network;
a memory that stores at least instructions; and
one or more processor devices that execute instructions that perform actions, including:
providing, by the one or more processors, a data model comprised of nodes and edges that includes a plurality of data objects that is stored in a non-transitory computer readable memory that is configured and arranged to store the data model of the network computer, wherein each data object includes a plurality of data object line items;
employing, by the one or more processors, geolocation information provided, by one or more global positioning systems (GPS) devices, to select features of the plurality of data objects and data object line items based on a physical location of a user's client computer, wherein the selected features include one or more of time zones, languages, currencies, or calendar formatting, and wherein the features are used by one or more of user-interfaces, internal processes, or databases;
providing, by the one or more processors, a plurality of allocation rules that allocate the resources between the two or more of the plurality of data objects;
employing, by the one or more processors, the plurality of allocation rules to identify one or more key features of one or more data objects of the plurality of data objects, wherein the one or more key features are used by the allocation rules to allocate the resources;

when the actions of the one or more processors identify the one or more key features performing further actions, including:

retrieving, by the one or more processors, the stored data model from the non-transitory computer readable memory;

modifying, by the one or more processors, the data model by providing one or more grouped objects that separately correspond to one or more source data objects that allocate the resources to one or more target data objects based on an execution of the allocation rules that include one or more of the one or more key features;

generating, by the one or more processors, one or more grouped object line items for each of the one or more grouped objects based on each distinct value of the one or more key features, wherein one or more source data object line items that include the same one or more key features are grouped together to improve computational efficiency by collapsing rows to a minimum cardinality of rows based on one or more columns of the one or more source data objects that correspond to the one or more key features, which are also pertinent to generating report information regarding operation of the allocation rules, to provide the one or more grouped object line items, wherein a grouped object line item is provided for the each distinct value of the one or more key features, and wherein one or more other features of the one or more source data object line items are included in multi-valued columns of the one or more grouped object line items; and modifying, by the one or more processors, the data model by providing one or more assignment ratio tables that include one or more assignment ratio rows based on the allocation rules, wherein the one or more assignment ratio rows in the one or more assignment ratio tables provide allocations using the grouped object line items; wherein the modified data model and the one or more assignment ratio tables are stored in the non-transitory computer readable memory of the network computer, and wherein the one or more selected features improve the user's understanding of the modified data model that is displayed to the user of the client computer when the client computer is located at a particular physical location.

23. The network computer of claim 22, further comprising:

when a query is provided, performing further actions, including:

traversing at least a portion of the plurality of data objects based on the query; and when a grouped object is encountered during traversal, providing at least a portion of results for the query using one or more of the grouped object's line items.

24. The network computer of claim 22, further comprising, storing one or more values from individual data object line items in a grouped object line item, wherein the one or more values enable a corresponding individual data object line item, from the individual data object lines items, to be resolved from the grouped object line item.

25. The network computer of claim 22, wherein generating the one or more assignment ratio tables, further includes, employing the one or more grouped object line items to generate one or more of the rows in the assignment ratio tables, wherein the one or more of the rows represent the allocation of resources for one or more data objects.

26. The network computer of claim 22, further comprising, when a query references one or more features that are absent from a grouped object, accessing the one or more features directly from a data object that is stored in the non-transitory computer readable memory that corresponds to the grouped object.

27. The network computer of claim 22, further comprising, identifying one or more of the plurality of data objects that are used to provide one or more of the one or more grouped objects.

28. The network computer of claim 22, further comprising, updating the one or more grouped objects based on modifications that are made to one or more of the plurality of allocation rules, wherein the modifications include one or more of an increase in a number of the one or more key features, or a decrease in the number of the one or more key features.

* * * * *